United States Patent
Lee et al.

(10) Patent No.: US 11,858,528 B2
(45) Date of Patent: Jan. 2, 2024

(54) DRIVING CONTROL SYSTEM WITH DRIVING ASSISTANCE CONTROL AND AUTONOMOUS DRIVING CONTROL

(71) Applicant: Samsung Electro-Mechanics Co., Ltd., Suwon-si (KR)

(72) Inventors: Yun-Tae Lee, Suwon-si (KR); Joon-Seok Chae, Suwon-si (KR); Young-Ki Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 575 days.

(21) Appl. No.: 17/053,841

(22) PCT Filed: Nov. 12, 2019

(86) PCT No.: PCT/KR2019/015369
§ 371 (c)(1),
(2) Date: Nov. 9, 2020

(87) PCT Pub. No.: WO2020/101328
PCT Pub. Date: May 22, 2020

(65) Prior Publication Data
US 2021/0229697 A1  Jul. 29, 2021

(30) Foreign Application Priority Data

Nov. 13, 2018 (KR) .................... 10-2018-0138841
Apr. 23, 2019 (WO) ............. PCT/KR2019/004904

(51) Int. Cl.
*B60W 60/00* (2020.01)
*B60W 30/182* (2020.01)
(Continued)

(52) U.S. Cl.
CPC .......... *B60W 60/001* (2020.02); *B60W 30/08* (2013.01); *B60W 30/09* (2013.01);
(Continued)

(58) Field of Classification Search
CPC .... B60W 60/001; B60W 30/08; B60W 30/09; B60W 30/095; B60W 30/0953;
(Continued)

(56) References Cited

U.S. PATENT DOCUMENTS 9,008,890 B1 *  4/2015  Herbach ............. G05D 1/0212
340/436
2014/0200765 A1  7/2014  Waeller
(Continued)

FOREIGN PATENT DOCUMENTS

KR       10-0871913 B1      12/2008
KR    10-2012-0075555 A      7/2012
(Continued)

OTHER PUBLICATIONS

Comma.ai, "A panda and a cabana: How to get started car hacking with comma.ai," blog post, https://blog.comma.ai/a-panda-and-a-cabana-how-to-get-started-car-hacking-with-comma-ai/, published Jul. 7, 2017. (Year: 2017).*

(Continued)

*Primary Examiner* — Donald J Wallace
*Assistant Examiner* — Daniel M. Robert
(74) *Attorney, Agent, or Firm* — NSIP Law

(57) ABSTRACT

Provided are a driving assistance system and method. The driving assistance system is for interfacing with an individual vehicle and includes: a camera system that generates image information about the surroundings of the vehicle; a vehicle controller that generates driving information about the vehicle; and a communication port. The driving assistance system includes a driving assistance terminal and/or mobile device that are/is connected to the communication port, acquire(s) image information and/or driving information by using the communication port, and execute(s) at least a portion of a travel program for the driving assistance (Continued)

terminal and/or mobile device on the basis of an image and/or driving information for controlling the vehicle with respect to one or more of auxiliary travels and/or autonomous operations of the vehicle through a control signal generated by the driving assistance terminal or the mobile device and provided to the vehicle.

24 Claims, 15 Drawing Sheets

(51) Int. Cl.
| | | |
|---|---|---|
| *B60W 50/14* | (2020.01) | |
| *G06V 20/56* | (2022.01) | |
| *B60W 30/09* | (2012.01) | |
| *B60W 30/095* | (2012.01) | |
| *B60W 30/08* | (2012.01) | |
| *G05D 1/00* | (2006.01) | |
| *B60W 50/00* | (2006.01) | |

(52) U.S. Cl.
CPC ...... *B60W 30/095* (2013.01); *B60W 30/0953* (2013.01); *B60W 30/0956* (2013.01); *B60W 30/182* (2013.01); *B60W 50/14* (2013.01); *G05D 1/0011* (2013.01); *G06V 20/56* (2022.01); *B60W 2050/0013* (2013.01); *B60W 2050/0064* (2013.01); *B60W 2050/146* (2013.01); *B60W 2420/403* (2013.01); *B60W 2420/42* (2013.01)

(58) Field of Classification Search
CPC ........... B60W 30/0956; B60W 30/182; B60W 50/14; B60W 2050/146; B60W 2420/403; B60W 2420/42; B60W 30/18163; B60W 30/14; B60W 40/02; B60W 2556/45; G06V 20/56; G07C 5/0808; G05D 1/0022; G05D 1/0285

See application file for complete search history.

(56) References Cited

U.S. PATENT DOCUMENTS

| | | | | |
|---|---|---|---|---|
| 2015/0094899 A1* | 4/2015 | Hackenberg | ...... | B60W 60/0059 701/23 |
| 2016/0167653 A1* | 6/2016 | Malone | ................ | B60W 10/18 701/23 |
| 2018/0194365 A1 | 7/2018 | Bae et al. | | |
| 2018/0232195 A1 | 8/2018 | Jaegal et al. | | |
| 2018/0246521 A1* | 8/2018 | Seo | ...................... | G05D 1/0246 |
| 2019/0018406 A1* | 1/2019 | Tudosie | ............ | B60W 60/0053 |
| 2019/0210544 A1* | 7/2019 | Gowda | ............... | B60R 16/0231 |
| 2020/0033880 A1* | 1/2020 | Kehl | ........................ | G01S 17/89 |
| 2021/0086364 A1* | 3/2021 | Handa | ................... | G06T 1/0014 |
| 2021/0150757 A1* | 5/2021 | Mustikovela | ............ | G06N 3/08 |
| 2021/0245779 A1* | 8/2021 | Suzuki | ................ | B60W 50/029 |

FOREIGN PATENT DOCUMENTS

| | | | |
|---|---|---|---|
| KR | 10-2016-0049805 A | 5/2016 | |
| KR | 10-1730315 B1 | 4/2017 | |
| KR | 10-2018-0024327 A | 3/2018 | |
| KR | 10-1842658 B1 | 3/2018 | |
| KR | 10-2018-0043009 A | 4/2018 | |
| WO | WO-2017125788 A1 * | 7/2017 | |
| WO | WO-2020101328 A1 * | 5/2020 | .......... B60W 30/182 |

OTHER PUBLICATIONS

Comma.ai, "How does openpilot work?" blog post, https://blog.comma.ai/how-does-openpilot-work/, published Jun. 26, 2017. (Year: 2017).*

Comma.ai, "openpilot port guide for Toyota models," blog post, https://blog.comma.ai/openpilot-port-guide-for-toyota-models/, published Jan. 31, 2018. (Year: 2018).*

YouTube video clip entitled "Dataspeed ADAS By-Wire Kit," uploaded on Jul. 12, 2019 by user "DataspeedInc" Retrieved from Internet on Jun. 13, 2022: <https://www.youtube.com/watch?v=Grly8qvWRqU>. (Year: 2019).*

En.wikipedia.org s.v. "Neuromorhic engineering," accessed Jul. 19, 2023 https://en.wikipedia.org/wiki/Neuromorphic_engineering (Year: 2023).*

DataspeedInc (see the YouTube video clip entitled "Dataspeed ADAS By-Wire Kit," uploaded on Jul. 12, 2019 by user "DataspeedInc", retrieved from internet on Jun. 13, 2022: <https://www.youtube.com/watch?v=Grly8qvWRqU>) (Year: 2019).*

International Search Report dated Feb. 24, 2020 in counterpart International Patent Application No. PCT/KR2019/015369 (2 pages in English and 2 pages in Korean).

* cited by examiner (a)

(b)

(a)        (b)

DRIVING CONTROL SYSTEM WITH DRIVING ASSISTANCE CONTROL AND AUTONOMOUS DRIVING CONTROL

CROSS REFERENCE TO RELATED APPLICATIONS

This application is a U.S. National Stage Application of International Application No. PCT/KR2019/015369, filed on Nov. 12, 2019, which claims the benefit under 35 USC 119(a) and 365(b) of Korean Patent Application No. 10-2018-0138841, filed on Nov. 13, 2018, and PCT/KR2019/004904, filed on Apr. 23, 2019 in the Korean Intellectual Property Office, the entire disclosures of which are incorporated herein by reference for all purposes.

TECHNICAL FIELD

The present disclosure relates to a driving support system and method.

BACKGROUND ART

Autonomous or self-driving vehicles, or semi-autonomous or assisted-driving vehicles, are increasingly being used to achieve driving efficiency and convenience in driving as well as reductions in traffic accidents. To implement such autonomous/self driving or semi-autonomous/assisted driving operations, there are various issues being addressed in various implementations in relation to the control of such vehicles, from merely providing information to the driver regarding a driving experience, providing driving assistance functions where one or more of braking, acceleration, and/or steering may be selectively controlled while requiring the driver to supervise the same, where such driving assistance functions may include lane departure warnings or avoidance, collision avoidance or automated emergency braking, or blind spot warning, while still further implementations have the vehicle additionally or alternatively performing the driving of the vehicle and the passenger only needing to perform driving upon request by the vehicle, or still further more full automated implementations where the vehicle will not require the passenger to perform any driving functions, or even where the vehicle does not include a steering wheel and the acceleration and braking pedals. Such vehicle implementations may provide such various capabilities of information services, driving assistance, semi-autonomous, autonomous, and fully autonomous driving through respective driving programs in vehicles to implement such different levels of information, assistance, and/or autonomy. Thus, many automobile manufacturing companies, non-automobile manufacturing companies, and non-manufacturing companies and institutions have been developing various driving programs for such different levels of information, assistance, and/or autonomy respectively through an advanced driver assistance system (ADAS).

Also, while vehicle manufacturers have manufactured or indicate they will manufacture automobiles with engineering configurations that have the designed capability to provide information or other feedback and to control acceleration, braking, steering, etc., entirely based on electronic control signals, the same manufactures have been slow to enable such capabilities to be implemented by the vehicles through such various driving programs, e.g., with no manufacturer producing a commercially available vehicle with an autonomous driving program in a vehicle to implement fully autonomous driving. Thus, though such vehicles may have the physical capabilities for such automated and assistive/informative implementations through various control signals, as these vehicles are being released without such autonomous driving programs or without various assistance or informative programs, users have yet been able to experience fully autonomous driving and/or experience various assistive and/or informative services when using such vehicles, or may be constrained to the automobile manufacturer's closed system or proprietary driving program that only enables a limited autonomy and/or assistive/informative services with respect to the vehicle, e.g., where the vehicle has the engineering or manufactured capability of providing such assistive and/or informative services and control of all driving components based on respective control signaling, for example, but the manufacturer's autonomous driving program of the vehicle only enables limited driving condition information to the driver when the vehicle could, with alternate programing, have provided many other informative/assistive functions and some, more, or full autonomous controls of the vehicle driving. In addition, such manufacturers typically may not provide updates to such driving programs after the manufacture of the vehicle, e.g., as additional or alternative informative, assistive, and/or autonomy based functionalities become available.

DISCLOSURE

Technical Solution

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a driving support system, for interacting with a separate vehicle including a camera system generating image information of a periphery of the vehicle, a vehicle controller generating driving information of the vehicle, and a communications port, includes a driving support terminal including one or more processors configured to connect with the communications port, to obtain the image information and/or the driving information using the communications port, to execute at least a portion of a driving program, of the driving support terminal, based on the image and/or the driving information to control the vehicle with respect to one or more assistive driving and/or autonomous operations by the vehicle through control signaling generated by the driving support terminal and provided to the vehicle.

The driving program of the driving support terminal may include a driving assistance program and/or an autonomous driving program.

The vehicle controller may be configured to execute a vehicle driving program including a vehicle driving assistance program and/or a vehicle autonomous driving program, stored in a memory of the vehicle, for controlling the vehicle.

The one or more processors of the driving support terminal may be further configured to determine which of the driving assistance program of the driving program of the driving support terminal and the vehicle driving assistance program of the vehicle driving program are a highest ADAS level driving assistance program, and/or determine which of the autonomous driving program of the driving program of the driving support terminal and the vehicle autonomous driving program of the vehicle driving program are a highest ADAS level autonomous driving program, and configured to execute the highest ADAS level driving assistance program and/or the highest ADAS level autonomous driving program to control the vehicle with respect to the one or more assistive driving and/or autonomous operations by the vehicle.

The one or more processors of the driving support terminal may be further configured to perform a first determination of which functionalities of the driving program of the driving support terminal are of a greater functionality level than corresponding functionalities of the vehicle driving program, perform a second determination of which functionalities of the driving program of the driving support terminal are not provided by the vehicle driving program, and/or perform a third determination of which functionalities of the vehicle driving program are not provided by the driving program of the driving support terminal, and configured to control implemented driving program functionalities by the vehicle by selectively implementing, as controlled by the driving support terminal, the driving program of the driving support terminal and the vehicle driving program based on any one or any combination of the first determination, the second determination, and the third determination to control the vehicle with respect to the one or more assistive driving and/or autonomous operations by the vehicle.

The driving support system may further include a mobile device having one or more processors configured to execute at least a portion of a mobile device driving program, including a mobile device driving assistance program and/or a mobile device autonomous driving program, based on the image information and/or the driving information to control the vehicle with respect to the one or more assistive driving and/or autonomous operations by the vehicle, and the one or more processors of the mobile device, or the one or more processors of the driving support terminal, may be further configured to determine which of the driving assistance program of the driving program of the driving support terminal, the mobile device driving assistance program, and the vehicle driving assistance program of the vehicle driving program are a highest ADAS level driving assistance program, and/or determine which of the autonomous driving program of the driving program of the driving support terminal, the mobile device autonomous driving program, and the autonomous driving program of the vehicle driving program are a highest ADAS level autonomous driving program, and configured to execute the highest ADAS level driving assistance program and/or the highest ADAS level autonomous driving program to control the vehicle with respect to the one or more assistive driving and/or autonomous operations by the vehicle.

The driving support system may further include a mobile device having one or more processors configured to execute at least a portion of a mobile device driving program, including a mobile device driving assistance program and/or a mobile device autonomous driving program, based on the image information and/or the driving information to control the vehicle with respect to the one or more assistive driving and/or autonomous operations by the vehicle, and the one or more processors of the mobile device, or the one or more processors of the driving support terminal, may be further configured to perform a first determination of which functionalities of the driving program of the driving support terminal and functionalities of the mobile device driving program are of a greater functionality level than corresponding functionalities of the vehicle driving program, perform a second determination of which functionalities of the driving program of the driving support terminal and the mobile device driving program are not provided by the vehicle driving program, and/or perform a third determination of which functionalities of the vehicle driving program are not provided by the driving program of the driving support terminal and the mobile device driving program, and configured to control implemented driving program functionalities by the vehicle by selectively implementing, as controlled by the driving support terminal or the mobile device, the driving program of the driving support terminal, the mobile device driving program, and the vehicle driving program based on any one or any combination of the first determination, the second determination, and the third determination.

When the selective implementing of the driving program of the driving support terminal, the mobile device driving program, and the vehicle driving program based on any one or any combination of the first determination, the second determination, and the third determination may include selecting between corresponding functionalities of the driving program of the driving support terminal and the mobile driving program, where the one or more processors of the mobile device, or the one or more processors of the driving support terminal, may be configured to select from those corresponding functionalities a functionality that has a predetermined greater functionality.

The one or more processors of the driving support terminal may be further configured to perform a first determination of which functionalities of the driving program of the driving support terminal and functionalities of a mobile device driving program, of a mobile device in communication with the driving support terminal, are of a greater functionality level than corresponding functionalities of the vehicle driving program, perform a second determination of which functionalities of the driving program of the driving support terminal and the mobile device driving program are not provided by the vehicle driving program, and/or perform a third determination of which functionalities of the vehicle driving program are not provided by the driving program of the driving support terminal and the mobile device driving program, and configured to control implemented driving program functionalities by the vehicle by selectively implementing, as controlled by the driving support terminal, the driving program of the driving support terminal, the mobile device driving program, and the vehicle driving program based on any one or any combination of the first determination, the second determination, and the third determination to control the vehicle with respect to the one or more assistive driving and/or autonomous operations by the vehicle.

The driving support system may further include the mobile device, the mobile device having one or more processors and memory storing the mobile device driving program, including a mobile device driving assistance program and/or a mobile device autonomous driving program.

When the selective implementing of the driving program of the driving support terminal, the mobile device driving program, and the vehicle driving program based on any one or any combination of the first determination, the second determination, and the third determination may include selecting between corresponding functionalities of the driving program of the driving support terminal and the mobile driving program, where the one or more processors of the driving support terminal may be configured to select from those corresponding functionalities a functionality that has a predetermined greater functionality.

The one or more processors of the driving support terminal may be further configured to determine which of the driving assistance program of the driving program of the driving support terminal, a mobile device driving assistance program of a driving program of a mobile device in communication with the driving support terminal, and the vehicle driving assistance program of the vehicle driving program are a highest ADAS level driving assistance program, and/or determine which of the autonomous driving program of the driving program of the driving support terminal, a mobile device autonomous driving program of the driving program of the mobile device, and the autonomous driving program of the vehicle driving program are a highest ADAS level autonomous driving program, and configured to execute the highest ADAS level driving assistance program and/or the highest ADAS level autonomous driving program to control the vehicle with respect to the one or more assistive driving and/or autonomous operations by the vehicle.

The driving support system may further include the mobile device, the mobile device having one or more processors and memory storing the mobile device driving program, including the mobile device driving assistance program and the mobile device autonomous driving program.

For the generating of the control signaling, the driving assistance program may be configured to generate driving support control signaling and driving support information, where the driving support control signaling is signaling to assistively control an assistive driving operation of the vehicle to display the driving support information.

The driving support information of the vehicle may include information instructing the driver to control at least one of a steering, braking, and acceleration operations of the vehicle.

The instructing of the driver may include warning of obstacle detection and/or instructing the driver to perform corresponding obstacle avoidance steering and/or braking, providing rear collision warning and/or instructing the driver to perform corresponding rear collision avoidance braking, providing lane departure warning, instructing the driver to perform corresponding lane departure remedy or maintenance steering, and/or instructing the driver of suggested lane changes determined by the driving program.

For the generating of the control signaling, the driving assistance program may be configured to generate driving support control signaling, where the driving support control signaling may be signaling to control an assistive driving operation of the vehicle to assistively control at least one of a steering, braking, and acceleration operations of the vehicle.

The signaling to control the assistive driving operation of the vehicle to assistively control at least one of a steering, braking, and acceleration operations of the vehicle may include controlling at least one of the steering, braking, and acceleration operations of the vehicle for detected obstacle assistive avoidance, detected rear collision assistive avoidance, predicted and/or detected lane departure assistive prevention or remedy, and/or assistive lane changing determined by the driving program.

The driving support control signaling may be signaling to control the assistive driving operation of the vehicle to display driving support information generated by the driving assistance program indicating information regarding the at least one of the assistively controlled steering, braking, and acceleration operations of the vehicle.

The autonomous driving program may be configured to generate driving control signaling, where the driving control signaling may be signaling to control an autonomous driving operation of the vehicle to control at least one of a steering, braking, and acceleration operations of the vehicle without assistive control by the driver.

The generation of the driving control signaling may include performing any one or any combination of two or more of an occluded object prediction, a lane changing determination, a pedestrian recognition, a road change recognition, and a road sign recognition, and generating the driving control signaling based on results of the performance.

The one or more processors of the driving support terminal may include one or more artificial intelligence processors configured to load from a memory of the driving support system one or more artificial intelligence models and implementing the one or more artificial intelligence models to perform the any one or any combination of two or more of the occluded object prediction, the lane changing determination, the pedestrian recognition, the road change recognition, and the road sign recognition, and the generation of the driving control signaling based on results of the performance.

The one or more artificial intelligence processors may include one or more neuromorphic processors, and the one or more artificial intelligence models may be respective neuro network models.

The one or more processors may be configured to perform post processing on the obtained image information and/or other image information obtained by the driving support terminal model, and the one or more processors may include one or more artificial intelligence processors, where the executing of the at least the portion of the driving program may include executing one or more neural network models provided the post processed obtained image information and/or the post processed other image information.

The one or more processors may be configured to perform post processing on the obtained image information and/or other image information obtained by the driving support terminal model, and the one or processors may include one or more artificial intelligence processors, where the one or more processors may be configured to implement a navigation program using the post processing obtained image information and/or the post processed other image information by executing one or more neural network models using the one or more artificial intelligence processors provided the post processed obtained image information and/or the post processed other image information.

The one or more processors may be configured to connect with the communications port to obtain the driving information and configured to obtain other image information from another camera, separate from the vehicle, in communication with the driving support terminal, and may execute the at least the portion of the driving program based on the obtained diving information and the other image information.

The one or more processors may be configured to generate, from the other image information, an image of a periphery of the vehicle, and configured to provide the image of the periphery of the vehicle to the vehicle for display by the vehicle.

The driving support terminal may include an OBD-type connection terminal, and the driving support terminal is connected to the communications port using the OBD-type connection terminal.

The image information may be obtained from the vehicle and/or other image information may be obtained from a camera separate from the vehicle, and the one or more processors may be further configured to implement at least one of a navigation program using the image information and/or the other image information, and the driving information.

The driving support terminal may be connected to the communications port using a C-type USB terminal connection.

The driving support terminal may include a memory storing the driving assistance program and the autonomous driving program, and the one or more processors may include a neural processing unit generating the driving support information through the execution of the at least the portion of the driving program.

The neural processing unit may include an image input receiver to which an image obtained from the camera system is input, an image pre-processor configured to extract a region of interest image from the image input to the image receiver, a target recognizing neural network model implemented to recognize a target in the interest image, and a driving support information generator configured to execute at least a portion of the driving assistance program and/or the autonomous driving program with respect to the recognized target.

The driving support system may further include a mobile device having one or more processors configured to execute at least a portion of a mobile device driving program, including a mobile device driving assistance program and/or a mobile device autonomous driving program, based on the image information and/or the driving information to control the vehicle with respect to the one or more assistive driving and/or autonomous operations by the vehicle, where the one or more processors of the mobile device, or the one or more processors of the driving support terminal, may be further configured to determine which of the driving assistance program of the driving program of the driving support terminal and the mobile device driving assistance program are a highest ADAS level driving assistance program, and/or determine which of the autonomous driving program of the driving program of the driving support terminal and the mobile device autonomous driving program are a highest ADAS level autonomous driving program, and configured to execute the highest ADAS level driving assistance program and/or the highest ADAS level autonomous driving program to control the vehicle with respect to the one or more assistive driving and/or autonomous operations by the vehicle.

The driving support system may further include a mobile device having one or more processors configured to execute at least a portion of a mobile device driving program, including a mobile device driving assistance program and/or a mobile device autonomous driving program, based on the image and/or the driving information to control the vehicle with respect to the one or more assistive driving and/or autonomous operations by the vehicle, and the one or more processors of the mobile device, or the one or more processors of the driving support terminal, may be further configured to perform a first determination of which functionalities of the driving program of the driving support terminal and functionalities of the mobile device driving program are of a greater functionality level, perform a second determination of which functionalities of the driving program of the driving support terminal are not provided by the mobile device driving program, and/or perform a third determination of which functionalities of the mobile device driving program are not provided by the driving program of the driving support terminal, and configured to control implemented driving program functionalities by the vehicle by selectively implementing, as controlled by the mobile device or the driving support terminal, the driving program of the driving support terminal and the mobile device driving program based on any one or any combination of the first determination, the second determination, and the third determination to control the vehicle with respect to the one or more assistive driving and/or autonomous operations by the vehicle.

In one general aspect, a driving support method, for interacting with a vehicle including a camera system generating image information of a periphery of the vehicle, a vehicle controller generating driving information of the vehicle, and a communications port, includes connecting, by a device separate from the vehicle, with the communications port to obtain the image information and/or the driving information using the communications port, executing, by the device, at least a portion of a device driving program, including a driving assistance program and/or an autonomous driving program of a driving support terminal or a mobile device respectively as the device, based on the image information and/or the driving information and to control the vehicle with respect to one or more assistive driving and/or autonomous operations by the vehicle through control signaling generated by the driving support terminal or the mobile device, and providing the generated control signaling to the vehicle to control the vehicle with respect to one or more assistive driving and/or autonomous operations by the vehicle.

The method may further include determining which of the driving assistive program of the device driving program and any vehicle driving assistive program, of a driving program configured to be implemented by the vehicle, to implement in the generating of the control signaling by the driving support terminal or the mobile device, and/or determining which of the autonomous driving program of the device driving program and any vehicle autonomous driving program of the driving program, configured to be implemented by the vehicle, to implement in the generating of the control signaling by the driving support terminal or the mobile device.

The method may further include determining which respective functionalities of the device driving program and any vehicle driving program, configured to be implemented by the vehicle, to implement, for the generating of the control signaling by the driving support terminal or the mobile device.

In one general aspect, a driving support system, for interacting with a separate vehicle including a camera system generating image information of a periphery of the vehicle, a vehicle controller generating driving information of the vehicle, and a communications port, includes a smart phone having one or more processors configured to execute at least a portion of a mobile device driving program, including a mobile device driving assistance program and/or a mobile device autonomous driving program and stored in a memory of the smart phone, based on the image information and/or the driving information and to control the vehicle with respect to one or more assistive driving and/or autonomous operations by the vehicle through control signaling generated by the smart phone and provided to the vehicle.

The vehicle controller may be configured to execute a vehicle driving program including a vehicle driving assistance program and/or a vehicle autonomous driving program, stored in a memory of the vehicle, for controlling the vehicle.

The one or more processors of the smart phone may be further configured to determine which of the mobile device driving assistance program and the vehicle driving assistance program are a highest ADAS level driving assistance program, and/or determine which of the mobile device autonomous driving program and the vehicle autonomous driving program are a highest ADAS level autonomous driving program, and configured to execute the determined highest ADAS level driving assistance program and/or the determined highest ADAS level autonomous driving program to control the vehicle with respect to the one or more assistive driving and/or autonomous operations by the vehicle.

The one or more processors of the smart phone may be further configured to perform a first determination of which functionalities of the mobile device driving program are of a greater functionality level than corresponding functionalities of the vehicle driving program, perform a second determination of which functionalities of the mobile device driving program are not provided by the vehicle driving program, and/or perform a third determination of which functionalities of the vehicle driving program are not provided by the mobile device driving program, and configured to control implemented driving program functionalities by the vehicle by selectively implementing, as controlled by the smart phone, the mobile device driving program and/or the vehicle driving program based on any one or any combination of the first determination, the second determination, and the third determination to control the vehicle with respect to the one or more assistive driving and/or autonomous operations by the vehicle.

For the generating of the control signaling, the mobile device driving assistance program may be configured to generate driving support information to control an assistive driving operation of the vehicle to display the driving support information.

The driving support information of the vehicle may include information instructing the driver to control at least one of a steering, braking, and acceleration operations of the vehicle.

The instructing of the driver may include warning of obstacle detection and/or instructing the driver to perform corresponding obstacle avoidance steering and/or braking, providing rear collision warning, instructing the driver to perform corresponding rear collision avoidance braking, providing lane departure warning, instructing the driver to perform corresponding lane departure remedy or maintenance steering, and/or instructing the driver of suggested lane changes determined by the mobile device driving program.

For the generating of the control signaling by the smart phone, the mobile device driving assistance program may be configured to generate driving support control signaling, where the driving support control signaling is signaling to control an assistive driving operation of the vehicle to assistively control at least one of a steering, braking, and acceleration operations of the vehicle.

The signaling to control the assistive driving operation of the vehicle to control at least one of the steering, braking, and acceleration operations of the vehicle may include assistively controlling at least one of the steering, braking, and acceleration operations of the vehicle for detected obstacle assistive avoidance, detected rear collision assistive avoidance, predicted and/or detected lane departure assistive prevention or remedy, and/or assistive lane changing determined by the mobile device driving program.

The driving support control signaling may be signaling to control the assistive driving operation of the vehicle to display driving support information generated by the mobile device driving assistance program indicating information regarding the at least one of the assistively controlled steering, braking, and acceleration operations of the vehicle.

For the generating of the control signaling by the smart phone, the mobile device autonomous driving program may be configured to generate driving control signaling, where the driving control signaling may be signaling to control an autonomous driving operation of the vehicle to control at least one of a steering, braking, and acceleration operations of the vehicle without assistive control by the driver The generation of the driving control signaling may include performing any one or any combination of two or more of an occluded object prediction, a lane changing determination, a pedestrian recognition, a road change recognition, and a road sign recognition, and generating the driving control signaling based on results of the performance.

The one or more processors of the smart phone may include one or more artificial intelligence processors configured to load from the memory of the smart phone one or more artificial intelligence models and implement the one or more artificial intelligence models to perform the any one or any combination of two or more of the occluded object prediction, the lane changing determination, the pedestrian recognition, the road change recognition, the road sign recognition, and the generation of the driving control signaling based on results of the performance.

The one or more artificial intelligence processors may include one or more neuromorphic processors, and the one or more artificial intelligence models may be respective neuro network models.

The one or more processors may be configured to connect with the communications port to obtain the driving information, and to obtain other image information from at least one camera separate from the vehicle and in communication with the smart phone, and configured to execute the at least the portion of the mobile device driving program based at least on the obtained driving information and the other image information.

The at least one camera may include a camera included in the smart phone.

The one or more processors may be configured to generate, from the other image information, an image of a periphery of the vehicle, and configured to provide the generated image to the vehicle for display by the vehicle.

In one general aspect, a driving support system, for interacting with a separate vehicle including a camera system generating image information of a periphery of the vehicle, a vehicle controller generating driving information of the vehicle, and a communications port, includes a mobile device having one or more processors configured to execute at least a portion of a mobile device driving program, including a mobile device driving assistance program and/or a mobile device autonomous driving program and stored in a memory of the mobile device, based on the image information and/or the driving information and to control the vehicle with respect to one or more assistive driving and/or autonomous operations by the vehicle through control signaling generated by the mobile device, and a driving support terminal configured to connect with the communications port, and including communication hardware configured to obtain the image information and/or the driving information using the communications port, to communicate the obtained image information and/or the driving information to the mobile device, and to communicate the generated control signaling to the vehicle, where the mobile device is removably connected to, and separate from, the driving support terminal and includes computing functionalities distinct from providing driving support.

The vehicle controller may be configured to execute a vehicle driving program including a vehicle driving assistance program and/or a vehicle autonomous driving program, stored in a memory of the vehicle, for controlling the vehicle.

The one or more processors of the mobile device may be further configured to determine which of the mobile device driving assistance program and the vehicle driving assistance program are a highest ADAS level driving assistance program, and/or determine which of the mobile device autonomous driving program and the vehicle autonomous driving program are a highest ADAS level autonomous driving program, and configured to execute the determined highest ADAS level driving assistance program and/or the determined highest ADAS level autonomous driving program to control the vehicle with respect to the one or more assistive driving and/or autonomous operations by the vehicle.

The one or more processors of the mobile device may be further configured to perform a first determination of which functionalities of the mobile device driving program are of a greater functionality level than corresponding functionalities of the vehicle driving program, perform a second determination of which functionalities of the mobile device driving program are not provided by the vehicle driving program, and/or perform a third determination of which functionalities of the vehicle driving program are not provided by the mobile device driving program, and configured to control implemented, by control of the mobile device, driving program functionalities by the vehicle by selectively implementing the mobile device driving program and the vehicle driving program based on any one or any combination of the first determination, the second determination, and the third determination to control the vehicle with respect to the one or more assistive driving and/or autonomous operations by the vehicle.

The mobile device may be a smart phone.

The driving support terminal may further include a wireless power transfer module and a physical support, where the wireless power transfer module may be configured within the physical support to provide wireless power transfer to the mobile device further that may have a mobile wireless power transfer module configured for at least receipt of wirelessly transferred power.

The driving support terminal may include one or more processors configured to execute at least a portion of a driving support terminal driving program, including a driving support terminal driving assistance program and/or driving support terminal autonomous driving program, based on the image and/or the driving information to control the vehicle with respect to the one or more assistive driving and/or autonomous operations by the vehicle.

The driving support terminal may be further configured to receive the control signaling from the mobile device, and provide the control signaling to the communications port to be provided to the vehicle controller, through a controller area network (CAN) of the vehicle, for the control of the vehicle with respect to the one or more assistive driving and/or autonomous operations by the vehicle.

For the generating of the control signaling, the mobile device driving assistance program may be configured to generate driving support information to assistively control an assistive driving operation of the vehicle to display the driving support information.

The driving support information of the vehicle may include information instructing the driver to control at least one of a steering, braking, and acceleration operations of the vehicle.

The instructing of the driver may include warning of obstacle detection and/or instructing the driver to perform corresponding obstacle avoidance steering and/or braking, providing rear collision warning, instructing the driver to perform corresponding rear collision avoidance braking, providing lane departure warning, instructing the driver to perform corresponding lane departure remedy or maintenance steering, and/or instructing the driver of suggested lane changes determined by the driving program.

For the generating of the control signaling by the mobile device, the mobile device driving assistance program may be configured to generate driving support control signaling, where the driving support control signaling may be signaling to control an assistive driving operation of the vehicle to assistively control at least one of a steering, braking, and acceleration operations of the vehicle.

The signaling to control the assistive driving operation of the vehicle to control at least one of a steering, braking, and acceleration operations of the vehicle may include assistively controlling at least one of the steering, braking, and acceleration operations of the vehicle for detected obstacle assistive avoidance, detected rear collision assistive avoidance, predicted and/or detected lane departure assistive prevention or remedy, and/or assistive lane changing determined by the driving program.

The driving support control signaling may be signaling to control the assistive driving operation of the vehicle to display driving support information generated by the mobile device driving assistance program indicating information regarding the at least one of the assistively controlled steering, braking, and acceleration operations of the vehicle.

For the generating of the control signaling by the mobile device, the mobile device autonomous driving program may be configured to generate driving control signaling, where the driving control signaling is signaling to control an autonomous driving operation of the vehicle to control at least one of a steering, braking, and acceleration operations of the vehicle without assistive control by the driver.

The generation of the driving control signaling may include performing any one or any combination of two or more of an occluded object prediction, a lane changing determination, a pedestrian recognition, a road change recognition, and a road sign recognition, and generating the driving control signaling based on results of the performance.

The one or more processors of the mobile device may include one or more artificial intelligence processors configured to load from the memory of the mobile device one or more artificial intelligence models and implement the one or more artificial intelligence models to perform the any one or any combination of two or more of the occluded object prediction, the lane changing determination, the pedestrian recognition, the road change recognition, the road sign recognition, and the generation of the driving control signaling based on results of the performance.

The one or more artificial intelligence processors may include one or more neuromorphic processors, and the one or more artificial intelligence models may be respective neuro network models.

The one or more processors may be configured to generate mobile device image information, including an image of a periphery of the vehicle, based on the image information or other image information obtained by the mobile device, and to execute the at least the portion of the mobile device driving program based on the generated mobile device image information and/or to execute a navigation program based on the generated mobile device image information.

The other information may be obtained from a camera included in the mobile device.

DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

MODE FOR INVENTION

Figure 1:
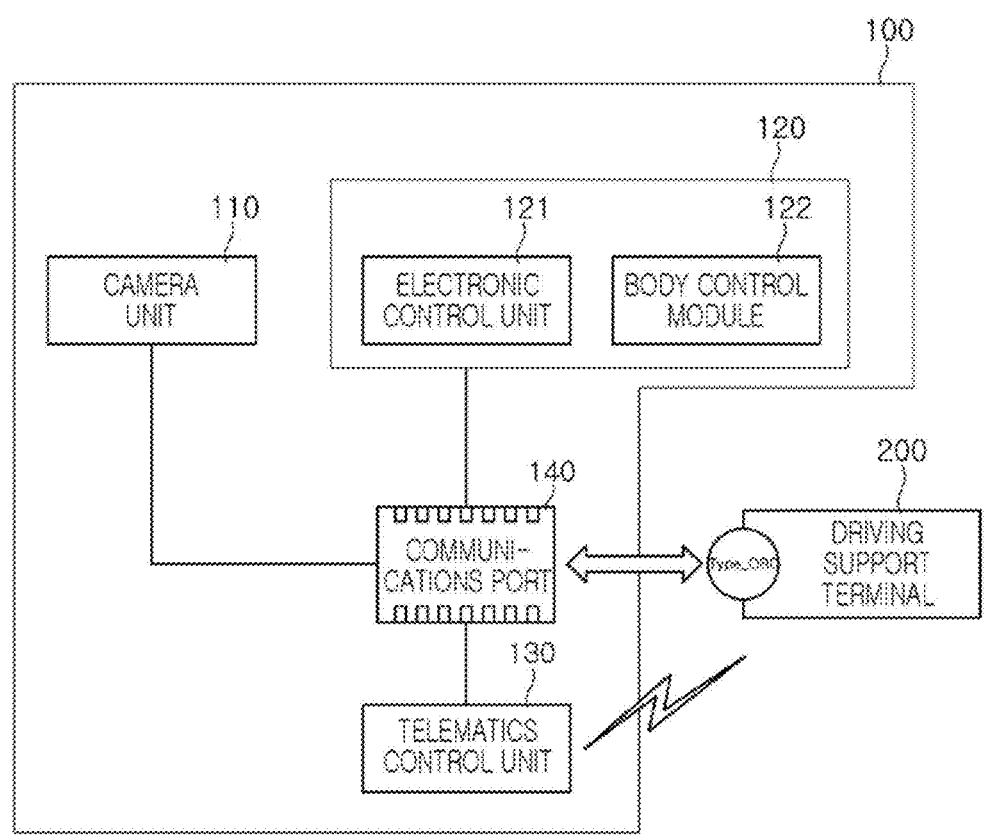
FIG. 1 is a block diagram illustrating a driving support system according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Also, it is to be understood that the various examples herein, although described through different illustrations, are not mutually exclusive. For example, structures, shapes, and sizes described with respect to such examples may be implemented in any of the other examples without departing from the spirit and scope of the present disclosure. Further, examples include those with various modifications of positions or arrangements of elements without departing from the spirit and scope of the present disclosure.

Additionally, although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, the singular forms are intended to include the plural forms as well, unless the context clearly indicates otherwise. For example, as used herein, the singular forms "a," "an," and "the" are intended to include the plural forms as well, unless the context clearly indicates otherwise. It should be further understood that the terms "include", "comprise", and/or "have," when used in this specification, specify the presence of stated features, integers, operations, elements, components or a combination/group thereof in an example embodiment, but do not preclude the presence or addition of one or more other features, integers, operations, elements, components, and/or combinations/groups thereof in alternative embodiments, nor the lack of such stated features, integers, operations, elements, components, and/or combinations/groups in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined herein, all terms used herein including technical or scientific terms have the same meanings as those generally understood by one of ordinary skill in the art consistent with and after an understanding of the present disclosure. Terms defined in dictionaries generally used should be construed to have meanings matching with contextual meanings in the related art and the present disclosure and are not to be construed as an ideal or excessively formal meaning unless otherwise defined herein.

FIG. 1 is a block diagram illustrating a driving support system according to one or more embodiments.

Referring to FIG. 1, a driving support system may include a camera unit 110, a vehicle control unit 120, a telematics control unit 130, a communications port 140, and a driving support terminal 200.

The camera unit 110, the vehicle control unit 120, the telematics control unit 130, and the communications port 140 may be components in a vehicle 100, such as those installed during a manufacturing of the vehicle 100. The driving support terminal 200 may be a hardware component selectively connected to the vehicle thereafter, for example, which may provide connectivity, or connectivity and physical support for additional devices, such as connectivity and/or physical support for the below discussed mobile device 300 example, which thereby may be in communication with the driving support terminal 200 and/or the vehicle control unit 120, for example. Here, the vehicle control unit 120, the telemetric control unit 130, the communications port 140, and driving support terminal 200 are each hardware devices or components, e.g., where each of the devices or components may be implemented as hardware only, hardware (e.g., one or more processors) that is configured through execution of computing-based instructions, or a combination of hardware and such hardware configured through execution of computing-based instructions, e.g., where, as explained further below, such instructions may be instructions which, when executed by such one or more processors, configure the one or more processors to implement any one, any combination, or all operations or methods of the respective devices or components described herein. In addition, though the devices or components are separately identified, examples exist where their respective functions are collectively implemented by a single device or component or where the respective functions are variously combined in two or more alternate devices or components in any combination.

The camera unit 110 may be mounted on the vehicle and may image an external region surrounding the vehicle. For example, the camera unit 110 may include one or more cameras and may generate an image of the periphery of the vehicle. The camera unit 110 may include four cameras, for example, and may image a front region, side regions, and a rear region of the vehicle and may generate an image of the periphery of the vehicle. The camera unit 110 may provide the generated image to the communications port 140. Additionally, the camera unit 110 may also be representative of one or more cameras and one or more processors that may be configured to perform pre-processing on captured images, such as to reduce noise, normalize the captured images, or otherwise perform image processing on the captured image or image information for availability from or transmission to the communications port 140 or the vehicle control unit 120, for example, as well as in examples for image processing of captured image or image information into a form or format for input to one or more artificial intelligence (AI) components or processor implemented models of the driving support terminal 200 (and/or mobile device 300 of FIGS. 4-6), such as a neuromorphic processing unit/processor included in the driving support terminal 200 (and/or mobile device 300), for example, or where the one or more processors, e.g., a CPU and/or GPU, represented by the driving support terminal 200 (or processor represented by the mobile device 300) are configured to implement such artificial intelligence models, such as a trained neural network system that may be trained to extract features or recognize objects or targets from provided image information, such as through a series of convolutional layers followed by a series of feed forward layers, as non-limiting examples, and which may further be configured to generate control signal outputs based on such extracted features, e.g., through further trained layers of the neural network system. In other examples, such as discussed below with respect to FIGS. 2-3 one or more of such image pre-processing operations may also or alternatively be performed by a data processing module 150.

Thus, the vehicle control unit 120 may include the electronic control unit 121 and a body control module 122, and may control overall operations of the vehicle.

The electronic control unit 121 may generate driving information including travelling information and operating information of the vehicle, and may control an engine of the vehicle in accordance with the generated travelling information and operating information.

The vehicle may include one or more sensors sensing a travelling state and an operating state of the vehicle, such as speed sensors, steering sensors, braking sensors, acceleration sensors, roll sensors, various driving component positional or value indicating sensors, as well as a temperature sensor example that may generate temperature information considered by the electronic control unit 121 to adjust acceleration and/or braking in near or below freezing conditions, or water or humidity sensor examples that generate corresponding information considered by the electronic control unit 121 to similarly adjust acceleration and/or braking in determined damp or wet road environments. The electronic control unit 121 may generate the travelling information and the operating information of the vehicle from such example sensed values outputs of the one or more sensors. The electronic control unit 121 may include a plurality of managing modules, i.e., processors or otherwise computing hardware, and may manage the sensed values output from the same types of sensors through an example single managing module. For example, the plurality of cameras of the camera unit 110 may be sensors imaging the periphery of the vehicle, and in this case, the electronic control unit 121 may manage images of the plurality of cameras of the camera unit 110 through a first managing module, while information or signals from environmental sensors such as the temperature or humidity sensors may be managed by a second managing module, where each managing module is configured to process the respectively received sensor information, and as discussed above perform various processing on the sensor data for provision to various other components of the vehicle, such as to an instrument cluster for mere informative notification to a driver and/or to the aforementioned artificial intelligence components and/or models implemented by the electronic control unit 121, for example.

The electronic control unit 121 may make available or provide the generated travelling information and the operating information to the communications port 140, as well as other information regarding control signaling that the electronic control unit 121 may be performing or that the electronic control unit 121 is configured to perform for the control of the vehicle, including any corresponding control signaling of/for information, driving assisting information and control, and/or other autonomous driving control, as non-limiting examples. Thus, the electronic control unit 121 may make available or provide (and/or be requested by the driving support terminal 200 and/or the mobile device 300) information of the current informative, assistive, and/or autonomous features or functionalities of the driving program included in the vehicle 100, e.g., as originally embedded in the electronic control unit 121 at the time of manufacture, for comparison, such as by the driving support terminal 200 and/or the mobile device 300, with those informative, assistive, and/or autonomous features or functionalities of the driving program included in the vehicle 100, and either or both of the driving support terminal 200 and/or the mobile device 300 may determine whether the supplementation to, or superseding of, such existing driving programming of the electronic control unit 121, e.g., with driving program(s) implemented by the driving support terminal 200 and/or the mobile device 300, or select functionalities thereof.

The program information or other information may be similarly made available or provided to the communications port 140 with positional or alignment registration information informing of the respective locations and/or configurations or properties of the cameras or camera systems of the camera unit 110, and/or their respective fields of view (FOV), for consideration by a driving program of the driving support terminal 200 and/or the mobile device 300 for properly registering the received image information for both informative, assistive, and autonomous driving functionalities, e.g., as different vehicles have different relative positions, heights, FOVs of their cameras that are installed during vehicle manufacture, for example. The driving support terminal 200 and/or the mobile device 300 may also be configured to communicate with a remote server to obtain such various vehicle specific information for proper expectation and use of the information provided by the respective cameras of camera unit 110 of the vehicle 100. The driving support terminal 200 and/or the mobile device 300 may also take into consideration additional variables, such as sensed tire pressure or user indicated non-OEM tire make and model and size, or other post-manufacture suspension modifications or other change information entered by the user or detectable by the driving support terminal 200 and/or the mobile device 300 using information from the camera unit 110, for example. In an example that includes the mobile device 300 and the driving support terminal 200, the driving support terminal 200 and/or the mobile device 300 may also have a predetermined relative positional relationship, e.g., based on the physical supporting configuration of the driving support terminal 200 and the positioning of the mobile device 300 in contact with the driving support terminal 200. Here, the user may enter in a user interface of the driving support terminal 200 and/or the mobile device 300 the manufacturer and model of the mobile device 300, or the driving support terminal 200 may merely request the same from the mobile device 300 or the mobile device 300 may similarly self-identify the same, for registering the location of the one or more cameras of the mobile device 300 as additional cameras for consideration by the driving program of the driving support terminal 200 and/or the mobile device 300. Information of any case or skin of the mobile device 300 may also be determined or similarly entered by the user. In such an example, the driving support terminal 200 may determine its position relative to the vehicle 100 based on information received from the one or more cameras of the mobile device 300 and information from the camera unit 110 and/or the user may enter such positioning information to the user interface of the driving support terminal 200 and/or the mobile device 300, for registration of the positions of the cameras of the mobile device 300 (or any alternative or additional supplemented cameras) relative to the vehicle 100 and to the positions of the other cameras of the camera unit 110, as non-limiting examples.

The communications port 140 may include an on-board diagnostics (OBD) port. The OBD port may be arranged in or near a consol of the vehicle and may be accessible by a passenger or driver for connection to external devices, such as typical code readers used by a mechanic to diagnose mechanical or electrical failures or problems in various components of the vehicle. The communications port 140 may communicate with such an external device connected to the communications port 140 and components of the vehicle through controller area network (CAN) communication, or may provide a network interface between such an external device connected to the communication port 140 and the corresponding CAN network connecting the components of the vehicle as illustrated, so the external device may receive and/or transmit information directly from/to such components using the CAN network. In an example, the CAN network may provide multiple serial communications using a same communication channel, such that multiple wirings or communication channels that were previously required between components in vehicles to provide or transmit different information may no longer be necessary as the different information can be provided or made available using the example same communication channel. As an example, the communications port 140 may connect with all of the camera unit 110, the electronic control unit 121, and the telematics control unit 130 through the CAN network.

The body control module 122 may control elements included in the body of the vehicle. For example, the body control module 122 may control wipers, lights, power seats, a sunroof, an air conditioning system, and the like.

A telematics control unit 130 may include a wireless communication module, and may perform wireless communication with one or more external devices present externally of the vehicle. For example, the telematics control unit 130 may be configured to perform at least one of cellular communications, Wi-Fi communications, Bluetooth communications, or other local, near, or far field communications, as non-limiting example. The telematics control unit 130 may receive external environment information of the vehicle through cellular communication, and may provide the received external environment information to the driving support terminal 200 through Wi-Fi communications, or the driving support terminal 200 (or mobile device 300 in examples) may request and receive such received external environment information. The telematics control unit 130 may also be configured to provide an alternate communication channel with the communications port 140, e.g., alternate to the OBD port, so the driving support terminal 200 (and/or the mobile device 300) can interact with the electronics control unit 121 or other components of the vehicle through the CAN network.

Accordingly, the driving support terminal 200 may be connected to the communications port 140 and may obtain the travelling information and the operating information of the vehicle generated in the electronic control unit 121, and images captured by the camera unit 110 or the aforementioned pre-processing image information results of such captured images. The driving support terminal 200 may also act as a communication intermediary or translation/conversion between the aforementioned mobile device 300 and the communications port 140.

The driving support terminal 200 may include a first connection terminal (Type_OBD) configured for mating with the communications port 140. As an example, the first connection terminal (Type_OBD) may include an OBD-type connection terminal.

The driving support terminal 200 may also, or alternatively, receive external environment information from the telematics control unit 130, as well as access to the CAN network through the communication channel between the telematics control unit 130 and the communications port 140. For example, the driving support terminal 200 and the telematics control unit 130 may receive data from and transmit data to each other through respective Wi-Fi communications modules. Additionally, the driving support terminal 200 may also include a communication module, e.g., providing cellular or other wide network radio communication, and request external environment information from a remote server, or request the same from the example mobile device 300 in the below examples, where the mobile device 300 includes such a communications module. Herein, the term module refers to a hardware component. As still another example, the functions of the telematics control unit 130 may be implemented by corresponding hardware of the communications port 140, and driving support terminal 200 may directly connect with the communications port 140 through such WiFi communications.

In examples herein, the driving support terminal 200 may be connected to the communications port 140 and may obtain the travelling information and the operating information of the vehicle, and/or may obtain the image information produced in the camera unit 110 or corresponding pre-processed image information, noting that examples are not limited thereto. In any of the various examples herein, a Wi-Fi communications module(s) may be provided in the camera unit 110, e.g., in a corresponding managing module or within each camera, and the communications port 140, and in this case, the driving support terminal 200 may perform wireless communication with the camera unit 110 and the communications port 140 and may obtain the travelling information and the operating information of the vehicle, and such various image information. As noted above, the camera unit 110 is representative of one or more cameras and/or camera systems, noting that the driving support system may further include in some examples one or more cameras of the aforementioned example mobile device 300 that may additionally be supported by, selectively mounted to, or otherwise mounted in or on the vehicle 100 and wiredly connected to the driving support terminal 200 or the mobile device 300 or wirelessly connected to the driving support terminal 200 and/or the mobile device 300, as non-limiting examples. For example, such an additional camera(s) may be connected to the driving support terminal 200 or the mobile device 300 using a USB wire and connector of the driving support terminal 200 or the mobile device 300, or through a proprietary connector of the mobile device 300, as non-limiting examples.

The driving support terminal 200 is configured to store at least one driving program, which in various examples includes driving programs respectively providing different levels of information, driving assistance and/or autonomy and/or programs providing different information, assistance, and/or autonomous functionalities within a same level of autonomy, and may variously consider the various available image information obtained and/or derived from the camera unit 110, the corresponding managing module, the electronic control unit 121, or otherwise available through the CAN network, e.g., accessed through the communications port 140, as well as other aforementioned example sensor information, the travelling information and the operating information of the vehicle obtained from the CAN network, e.g., through the communications port 140, and the aforementioned external environment information that may be obtained from the telematics control unit 130, to generate various driving support information and/or driving control signaling for an example level of autonomous driving control. The driving support terminal 200 may thus provide/transmit such information and/or driving control signaling to the communications port 140, which may interface with the CAN network to forward the respective different information to a center information display unit of the vehicle, the instrument cluster, and/or through sound generators for audible indication to provide the information to the driver, and may similarly interface with the CAN network to forward the respective driving control signaling to the electronic control unit 121 or the corresponding controlled components, such by sending braking control signaling to an electronic brake controller to activate (or reduce application of) the brakes with a controlled intensity, sending accelerator control signaling to an electronic accelerator controller to control the accelerator or otherwise control the throttle, and sending steering control signaling to an electronic steering controller or an electric power steering (EPS) to control extent and or speed of changes to the steering or the maintenance of a current steering control. In electric vehicle examples, the driving control signaling may be communicated to separate controllers of the different wheel motors, brakes, as well as steering systems. Also, in such electric vehicle examples, corresponding stored driving programs may perform such informative, assistive, and/or other autonomous control functionalities based on additional information from one or more battery modules, for example to maximize battery life or charge of the one or more battery modules. Alternatively, or additionally, the below discussed mobile device 300 may similarly store such a driving program and generate and provide/transmit such information and/or driving control signaling to the communication port 140, or the telematics control unit 130, directly or by using the driving support terminal 200 as an intermediary or translator with the vehicle, e.g., where the mobile device 300 either provides/transmits coding of instructions to the driving support terminal 200 to generate the corresponding information and/or control signaling or the mobile device 300 generates and provides/transmits such information and/or control signaling to the driving support terminal 200 that provides/transmits the same to the communication port 140. In the example where the mobile device 300 provides such coding of the instructions for the driving support terminal 200 to generate the information and/or control signaling, the driving support terminal 200 receives such coding of the instructions, e.g., in the communication protocol between the driving support terminal 200 and the mobile device 300, and generates the information and/or control signaling in the form at format compatible with the CAN communications protocol of the CAN network, and provides/transmits the same to the communication port 140, for example. The mobile device 300 may alternatively forward generate and forward the information and/or control signaling in the communication protocol between the driving support terminal 200 and the mobile device, and the driving support terminal 200 merely converts the information and/or the control signaling into the form and format compatible with the CAN network, and provides/transmits the same to the communication port 140, as non-limiting examples.

Accordingly, the driving support terminal 200 may provide various advanced driving support functionalities to a vehicle, e.g., depending on the driving program stored in the driving support terminal 200 (and/or stored in the mobile device 300), thereby providing an advanced driver assistance system (ADAS), for example.

The driving support terminal 200 in any of the examples herein may provide such advanced driving support functionality of a predetermined level prescribed in an ADAS standard. For example, according to the defined levels 0 through 5 of SAE J3016 from SAE International, initially established as the Society of Automotive Engineers, during SAE levels 0 through 2 the driver is driving whenever a number of driver support features are implemented or engaged, even if the driver's feet are off the pedals and the driver is not steering, as the driver must constantly supervise the support features, and must steer, brake, or accelerate as needed to maintain safety. Rather, in SAE levels 3-5 the driver is not driving when the driver support features are implemented or engaged, even if the driver is seated in 'the driver's seat', where in SAE level 3 the driver must drive when the vehicle or driver support feature requests, while in SAE levels 4 and 5 the automated driving features will not require the driver to take over driving. Beginning with SAE level 0, example driver support features that may be engaged include automatic emergency braking, blind spot warning, and lane departure warning, as non-limiting examples, and these features are limited to providing warnings and momentary assistance. With SAE level 1, the driver support features that may be engaged may further include lane centering or adaptive cruise control, where these features provide steering or brake/acceleration support to the driver, compared to SAE level 2 where the automated driving features further include both lane centering and adaptive cruise control at the same time, and where these features provide steering and brake/acceleration support to the driver. Thus, with SAE levels 0-2, the vehicles provide driver support features, compared with SAE levels 3-5 where the vehicles are considered as providing automated driving features. For example, with SAE level 3, example automated driving features may include traffic jam chauffeur, as a non-limiting example, and automated driving features of SAE level 4 include local driverless taxi, again as a non-limiting example, and even example vehicles where pedals/steering wheel may or may not be installed. With SAE levels 3 and 4, the automated driving features can drive the vehicle under limited conditions and will not operate unless all required conditions are met. The automated driving features of SAE level 5 may include all the automated driving features of SAE level 4, but the automated driving features can drive everywhere in all conditions. Another way to delineate such SAE levels are with respective names of the levels, such as SAE level 0 being referred to as 'no automation', SAE level 1 being referred to as 'driver assistance', SAE level 2 being referred to as 'partial automation', SAE level 3 being referred to as 'conditional automation', SAE level 4 being referred to as 'high automation', and SAE level 5 being referred to as 'full automation'. While the above example ADAS standard example was SAE J3016 from SAE, examples are not limited thereto. However, for simplicity of explanation below, such various available ADAS standards will collectively simply be referred to as the ADAS standard or an ADAS standard.

Figure 4:
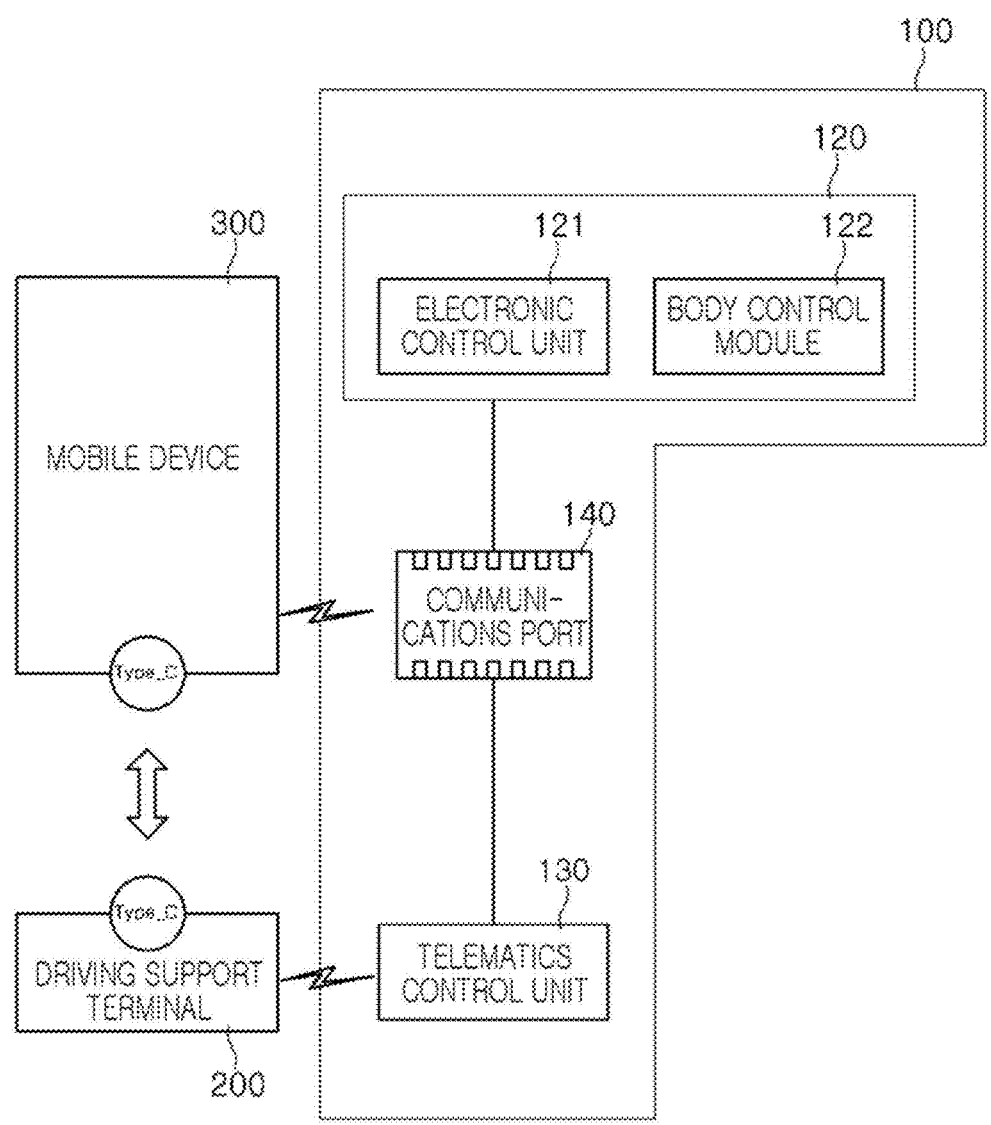
FIGS. 4 and 5 are block diagrams illustrating driving support systems according to one or more embodiments.
Figure 5:
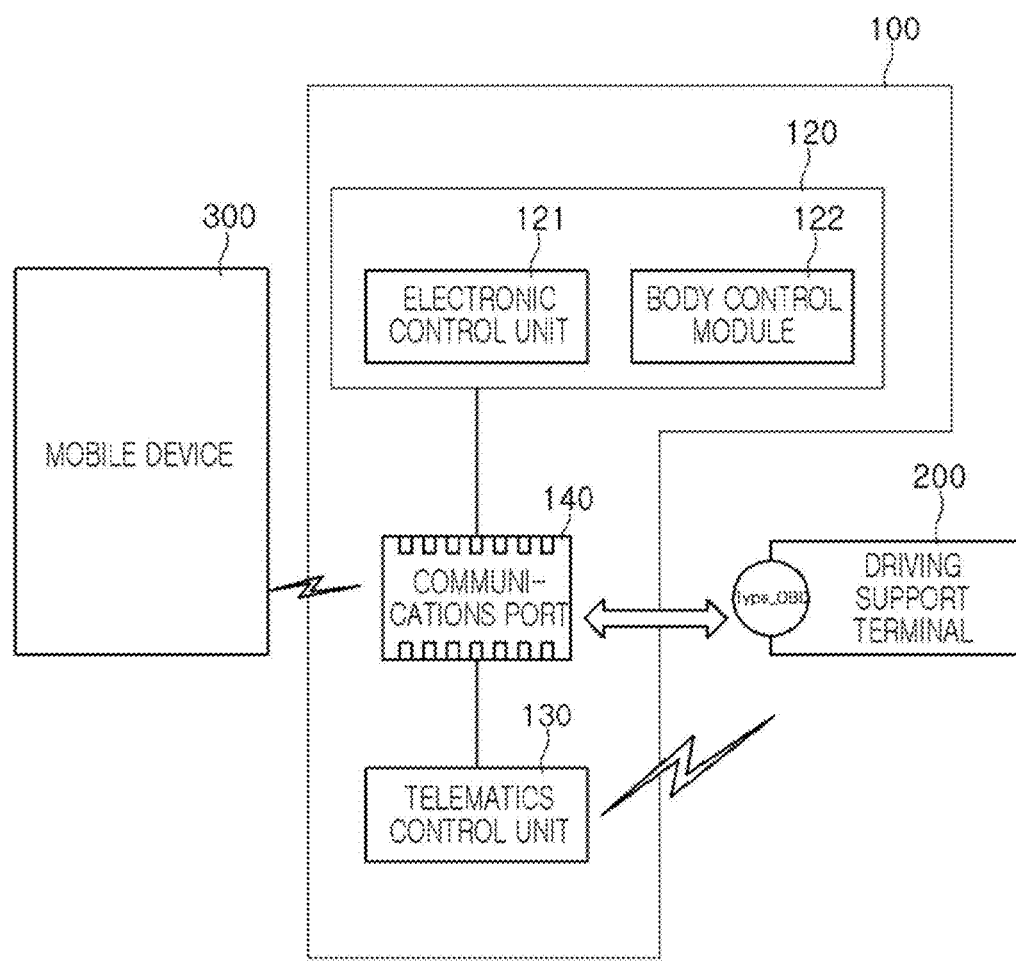
Figure 6:
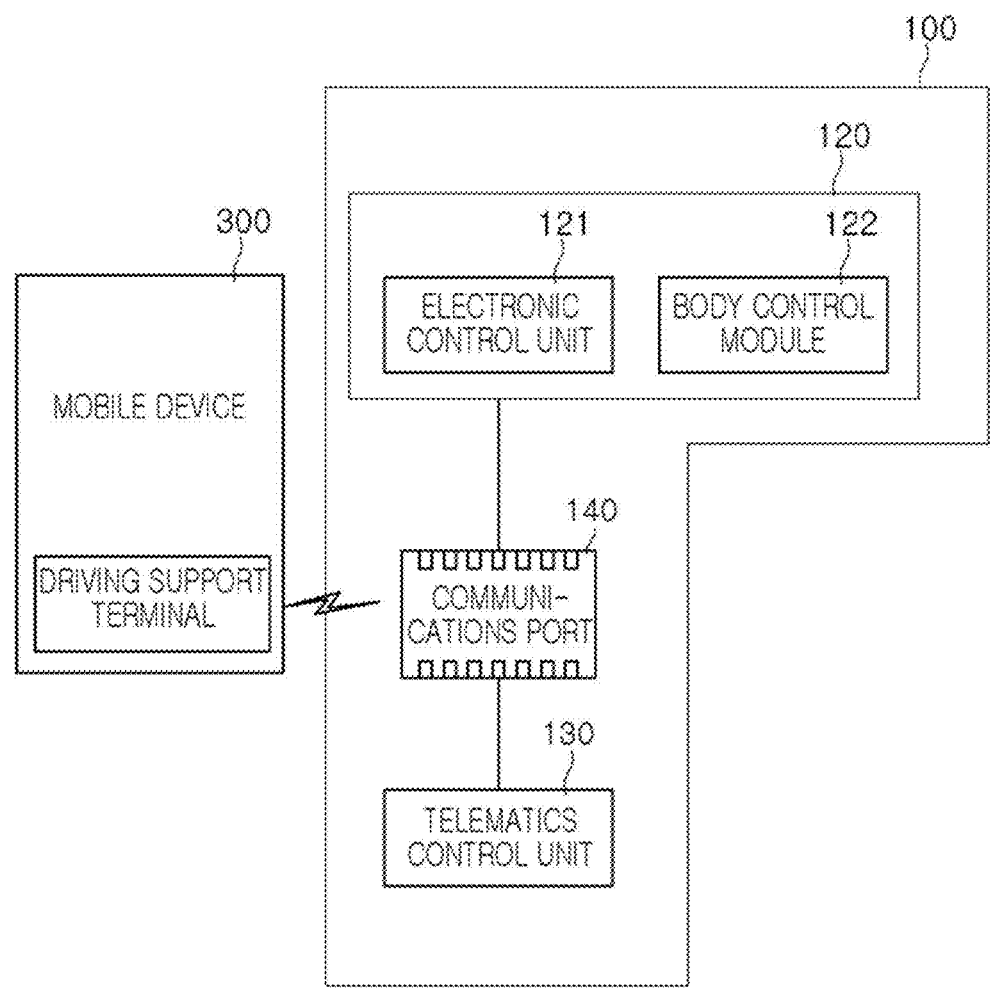
FIG. 6 is a block diagram illustrating a driving support system according to one or more embodiments.

Accordingly, the driving support terminal 200 may be configured to provide advanced driving support functionalities depending on the driving program stored in the driving support terminal 200 (or mobile device 300 in the examples of FIGS. 4-6).

Additionally, in different examples the driving support terminal 200 (and/or mobile device 300) may have different memory and processing capabilities, with one such example being where the driving support terminal 200 is pre-limited to implement or execute a driving program that provides an advanced driving support functionality corresponding to the second or lower ADAS levels, where a processing module of the driving support terminal 200 may include a high bandwidth memory (HBM) of 8 GB/512 bit, and may have a size of 65×65 mm, a processing speed of 10 peta floating point operations per second (10TFLOPS), and a power consumption level of 4 watts or less. As noted, this example driving support terminal 200 (and/or mobile device 300) may be pre-limited to driving programs that provide advanced driving support functionalities of levels 2 and below, i.e., not greater than level 2, which may include a forward collusion warning (FCW) function, a lane departure warning (LDW) function, a lane keeping assist (LKA) function, a blind spot warning (BSW) function, an adaptive cruise control (ACC) function, a travelling road recognizing function, a traffic signal recognizing function, and the like, as non-limiting examples.

In another example, the driving support terminal 200 (and/or mobile device 300) may have memory and processing capabilities corresponding to pre-limitation of the driving support terminal 200 (and/or mobile device 300) to implement or execute driving programs that provide an advanced driving support functionality of the third level or higher, where a processing module of the driving support terminal 200 may include a high bandwidth memory (HBM) of 32 GB/1024 bit, and may have a size of 180×120 mm, a processing speed of 100 peta floating point operations per second (10TFLOPS), and a power consumption level of 6.6 watts or less. As noted, this example driving support terminal 200 (and/or mobile device 300) may be pre-limited to driving programs that provide advanced driving support functionalities of the third level or higher prescribed in the ADAS standard, which may include an occluded object prediction function, a lane changing function, a pedestrian recognizing function, a road change recognizing function, a road sign recognizing function, and the like. Alternatively, in an example, with this example memory and processing configuration or an example memory and processing configuration with greater memory and processing capabilities, the driving support terminal 200 (and/or mobile device 300) may not be pre-limited as to which driving program can be executed or implemented, and thus may implement any driving program corresponding to any of the zeroth through fifth levels of the ADAS standard.

Accordingly, the driving support terminal 200 may include a driving program, which may include a driving assistance program and/or an autonomous driving program. As an example, in the case in which the driving support terminal 200 (or mobile device 300) is pre-limited, e.g., due to the above example lower memory and processing capabilities, to providing advanced driving support functionalities of the second level or lower of the ADAS standard, the driving support terminal 200 (and/or mobile device 300) may include only a driving assistance program.

Alternatively, in the case in which the driving support terminal 200 has the greater memory and processing functionalities is pre-limited to providing advanced driving support functionalities of the third level or higher of the ADAS standard, or the driving support terminal 200 (and/or mobile device 300) is not pre-limited to any particular level or levels of the ADAS standard, the driving program the driving support terminal 200 may implement may include either one or both of a driving assistance program and an autonomous driving program. In the description below, an example in which the driving support terminal 200 has such greater memory and processing capabilities and capable of implementing functionalities of both of a driving assistance program and an autonomous driving program will be described for ease of description.

In an example, the electronic control unit 121 may include such a memory and processor configuration with the example lower memory and processing capabilities for providing the advanced driving support functionalities of the second level or lower of the ADAS standard, while the driving support terminal 200 (and/or the mobile device 300) has the greater memory and processing functionalities of at least the third or higher levels of the ADAS standard, and may include either or both of a driving assistance program and an autonomous driving program. The driving support terminal 200 (and/or the mobile device 300) may request or otherwise obtain information of the driving informative, assistive, and control capabilities of the electronic control unit 121 and may selectively, e.g., based on user control or automatically, supersede or supplement the informative, assistive, and/or control functionalities of the electronic control unit 121 based on comparison of the functionalities of the driving program of the driving support terminal 200 (or mobile device 300) and the functionalities of the driving program of the electronic control unit 121, and if any of the functionalities of the driving program of the driving support terminal 200 (or mobile device 300) are of a higher ADAS level or provide additional or more functionality or features than the corresponding functionalities of the driving program of the electronic control unit 121, then those functionalities of the electronic control unit 121 may be superseded by the information and/or control signaling of the driving support terminal 200 (or mobile device 300). Alternatively, if the driving program of the electronic control unit 121 provides same informative or assistive functionalities as the driving program of the driving support terminal 200 (and/or mobile device 300), but does not provide an autonomous driving program, and the driving program of the driving support terminal 200 (and/or mobile device 300) includes an autonomous driving program, then the driving program of the electronic control unit 121 may be supplemented by the autonomous driving program of the driving program of the driving support terminal 200 (or mobile device 300).

Thus, the driving support terminal 200 (and/or mobile device 300) may apply a driving program that includes a driving assistance program and an autonomous driving program that respectively consider the image information (or the aforementioned pre-processing image information, such as from a corresponding managing module) provided from the camera unit 110, the travelling information and the operating information of the vehicle obtained from the communications port 140, and the external environment information obtained from the telematics control unit 130 and may generate various driving support information and/or driving control signaling. As discussed further below, either or both of the driving assistance program and the autonomous driving program may include one or more AI models, such as through implementation of neural networks, or other machine learning implementations. In addition, in examples, the driving assistance program and the autonomous driving program may share artificial intelligence processes or models, such as where an object detection is performed with respect to considered image information using an example trained neural network object detection model that is trained to output information that is considered by both the driving assistance program and the autonomous driving program for different respective functionalities or trained to output respective different information that the two different programs respectively consider, such as where a functionality provided by the driving assistance program may be performed based a first feature or corresponding resultant aspect, probability, classification, etc., of an object in an image and the autonomous driving program may be performed based on a second feature or corresponding resultant aspect, probability, classification, etc., of the object in the image. In such an example trained neural network object detection model, the image information may be input to a first layer of the neural network and then a series of convolutional neural network layers for feature extraction, which may be followed by a number of feed forward neural network layers or other recurrent, bi-directional recurrent, long-short term memory (LSTM) layers, etc., depending on the purposed objective for the neural network model during the training of the model, and the functionality performed dependent on the results of such a neural network model. Such a neural network model may also be utilized for multiple functionalities, and multiple such neural network models collectively utilized for a single functionality. Though examples are discussed above with respect to the artificial intelligence model having various neural network configuration, other neural network configurations and other machine learning models are also available, noting that examples are not limited to the examples herein.

For example, the driving support terminal 200 (or mobile device 300) may sense peripheral obstacles by implementing a corresponding artificial intelligence model, as a non-limiting example, which may recognize a distance to the sensed peripheral obstacle. When the recognized distance is less than a reference distance based on an indication by the artificial intelligence model, the driving support terminal 200 may provide a collision warning, in another example the artificial intelligence model may also be trained to generate a control signal in such a situation to automatically implement emergency braking or such a signaling may be generated based on the determination to issue the collision warning. In another example, the artificial intelligence model may alternatively be trained to generate the control signal for such emergency braking when the recognized distance is less than a shorter reference distance and/or based on other considered factors. The driving support terminal 200 may sense whether the vehicle has departed from a lane, e.g., using the same or another artificial intelligence model, and when the vehicle has departed from a lane, the driving support terminal 200 may determine to provide a departure warning or the same may be automatically issued by the artificial intelligence model's determination, and similarly the artificial intelligence model may simultaneously also issue assistive driving control signaling or be trained to issue the assistive driving control signaling upon a determined greater lane departure. The driving support terminal 200 may recognize pedestrians around the vehicle though such an aforementioned object detection artificial intelligence model or another artificial intelligence model, which may be trained to predict a future moving route of detected pedestrians, such as through recurrently or bi-directionally connected layers or LSTM layers, or similar functionality components of the artificial intelligence model, to support the driving of a user, and similar to above the artificial intelligence model may be trained for obstacle avoidance, i.e., to avoid the predicted future pedestrians, and to accordingly issue control signaling to control steering, acceleration, and/or braking to avoid the predicted future pedestrians, or such avoidance may otherwise be controlled by driving program of the driving support terminal 200. The driving support terminal 200 may also similarly through same or respective artificial intelligence models support a function of maintaining and changing a lane and may support the driving on a crossroad without a lane, a general road, an off-road, etc., by issuing drive control signaling to the electronic control unit 121 to control the electronic control unit 121 to accordingly control the appropriate driving components of the vehicle, or by sending such drive control signaling directly to the controlled driving components of the vehicle.

The driving support terminal 200 (and/or mobile device 300) may determine an indication of malfunction of the vehicle using the operating information of the vehicle, and may suggest a cause of the malfunction and a solution to the user. Further, the driving support terminal 200 (and/or mobile device 300) may control the body control module 122 depending on external environment information, such as an example where the body control module 122 may control an operation of the air conditioning system of the vehicle 100 based on an internal temperature being greater than a first threshold while the exterior temperatures is greater than a second threshold.

In addition to such included processors and memories, the driving support terminal 200 (and/or the mobile device 300) is representative of a display and user interface that may be controlled to display a preference place on a current travelling route of the vehicle depending on predetermined user information, and may provide an analysis of a price of the preference place and a reservation service, and/or control display of the same to the information display system of the vehicle 100. Above, various examples are discussed with respect to capabilities and operations of the driving support terminal 200 and the mobile device 300 with respect to driving programs that may be stored in the driving support terminal 200 and the mobile device 300. Similar to the discussion of the supplementation and/or superseding of the driving program of the electronic control unit 121, when the driving support terminal 200 is physically supporting the mobile device 300 and in communication therewith, such as through, wireless charging communication, Bluetooth, Wi-Fi, or a USB standard of a USB cabling or other proprietary connection therebetween, the highest ADAS level functionalities and/or additional or greater feature provision between the driving assistance programs and/or the autonomous driving programs among the electronic control unit 121, the driving support terminal 200, and the mobile device 300 may be selected, e.g., by a user or automatically, and any select and/or otherwise automatically selected highest/greatest informative and assistive functionality and/or autonomous driving control functionality may be ultimately provided, and the non-selected informative and assistive functionalities and/or autonomous driving control functionalities not provided, for example. Respective scoring of the functionalities in driving programs may be predetermined for example, such that a functionality in one driving program having a score higher than a corresponding functionality in another driving program may be considered to have the highest or greatest functionality. Additionally, as noted above, while the driving support terminal 200 may have the example lower memory and processing capable processor configuration pre-limited for a zeroth through second ADAS level, the mobile device 300 may have the higher memory and processing capable processor configuration and may be pre-limited to a third through fifth ADAS level, such that different memory/processing configurations may be performed in parallel or simultaneously with their respective driving programs so all levels of driving assistance and autonomous control may be provided, e.g., with the driving support terminal 200 implementing an assistance driving program and the mobile device 300 implementing an autonomous driving program, where the corresponding information and control signaling is provided from the driving support terminal 200 (or directly from the mobile device 300 or from the mobile device 300 through the driving support terminal 200) to the communications port 140, and either then, through the CAN network, directly provided to corresponding components or directly provided to the electronic control unit 121, for the provision of the provided information and assistive and autonomous driving control by the driving support terminal 200 and the mobile device 300. As another example, when the driving support terminal 200 does not store a driving program or stores a driving program with only low informative or assistive functionalities, then a higher or greater functionality driving assistance program and autonomous driving program of the driving program of the mobile device 300 may be implemented only, with the driving support terminal 200 acting merely as the intermediary and translator, e.g., to receive the aforementioned coded control information and convert the same into a form and format compatible with the CAN network for communication to the electronic control unit 121 or for direct control of the components of the vehicle, or act as merely an intermediary to receive and pass through to the communications port 140 such control signaling from the mobile device 300 already in the form and format of the CAN network for the communication to the electronic control unit 121 or for the direct control of the components of the vehicle. Similarly, in an example, the driving support terminal 200 may not include processing capabilities for implementing any driving program, and may only perform the intermediary function, as well as a charging function with the mobile device 300, e.g., through wireless charging.

Figure 2:
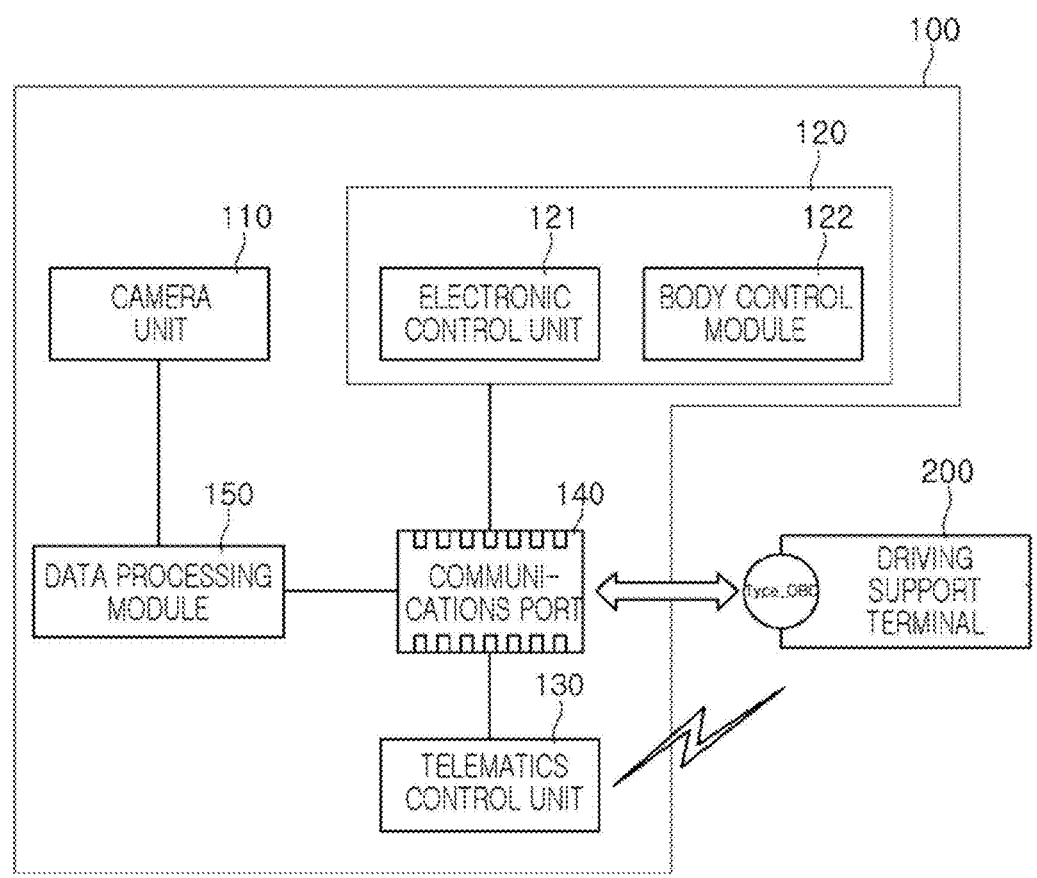
FIG. 2 is a block diagram illustrating a driving support system according to one or more embodiments.

FIG. 2 is a block diagram illustrating a driving support system according to one or more embodiments.

A driving support system in FIG. 2 may be similar to the driving support system illustrated in FIG. 1, and thus, overlapping descriptions will not be repeated, and differences will be described.

Referring to FIG. 2, the driving support system may further include a data processing module 150. In FIG. 2, the data processing module 150 may be a hardware component included in a vehicle 100.

A camera unit 110 may provide an obtained image to the data processing module 150. As an example, the camera unit 110 may provide a generated image signal to the data processing module 150 through a low voltage differential signaling (LVDS) interface.

The data processing module 150 may be connected to the communications port 140, and may obtain travelling information and operating information. As an example, the communications port 140 and the data processing module 150 may be connected to each other through the CAN network, noting that while examples herein discuss such connectedness between components in the vehicle being provided by such a CAN network with CAN communications protocols, examples are not limited thereto. The data processing module 150 may process an image provided from the camera unit 110 using the travelling information and the operating information, for example.

For example, when the data processing module 150 is implemented as a navigation device used in a vehicle, the data processing module 150 may include a navigation program, and the data processing module 150 may apply the navigation program to the image provided from the camera unit 110 and the travelling information provided from the electronic control unit 121 to generate post-processing data. The data processing module 150 may output the post-processing data via a display and speakers of the vehicle.

As another example, when the data processing module 150 includes a driving assistance program, the data processing module 150 may apply the driving assistance program to the image provided from the camera unit 110 and the travelling information provided from the electronic control unit 121 and may generate post-processing data.

The data processing module 150 may make available or provide the generated post-processing data to the communications port 140, and may make available or provide the image provided from the camera unit 110 to the communications port 140.

The driving support terminal 200 may thus obtain or receive the image and/or the post-processing data via the communications port 140.

The driving support terminal 200 may determine whether to apply a driving program stored in the driving support terminal 200, e.g., depending on the post-processing data generated in the data processing module 150.

For example, when only the navigation program is applied to the post-processing data generated in the data processing module 150 without a driving assistance program by the vehicle 100, the driving support terminal 200 may apply a driving program of the driving support terminal 200, e.g., the corresponding driving assistance program and autonomous driving program of the driving program, to the received data.

However, when a driving assistance program is applied by the vehicle, e.g., by the electronics control unit 121, to the post-processing data provided from the data processing module 150, the driving support terminal 200 may only apply the autonomous driving program of the driving program of the driving support terminal 200 to the received data. In other words, when a driving assistance program is applied to the post-processing data by the vehicle, the driving support terminal 200 in an example may apply only an autonomous driving program to the received data without applying the driving assistance program such that a system source may be efficiently used.

Even when the driving assistance program is applied to the post-processing data, the driving support terminal 200 may compare the driving assistance program of the data processing module 150 with a driving assistance program of the driving support terminal 200, and when a function of the driving assistance program of the driving support terminal 200 is improved or additional functionalities provided over the driving assistance program of the data processing module 150, the driving support terminal 200 may apply the driving assistance program to the received data, e.g., the received image or processed image data independent of image data processed to which the driving assistance program of the data processing module 150 was applied. In such an example, the driving support terminal 200 may also predetermine such differences on functionalities, and provide an instruction or control signaling to the data processing module 150 to not implement the driving assistance program of the data processing module 150 and merely forward the image and/or image data otherwise processed by the data processing module 150.

Figure 3:
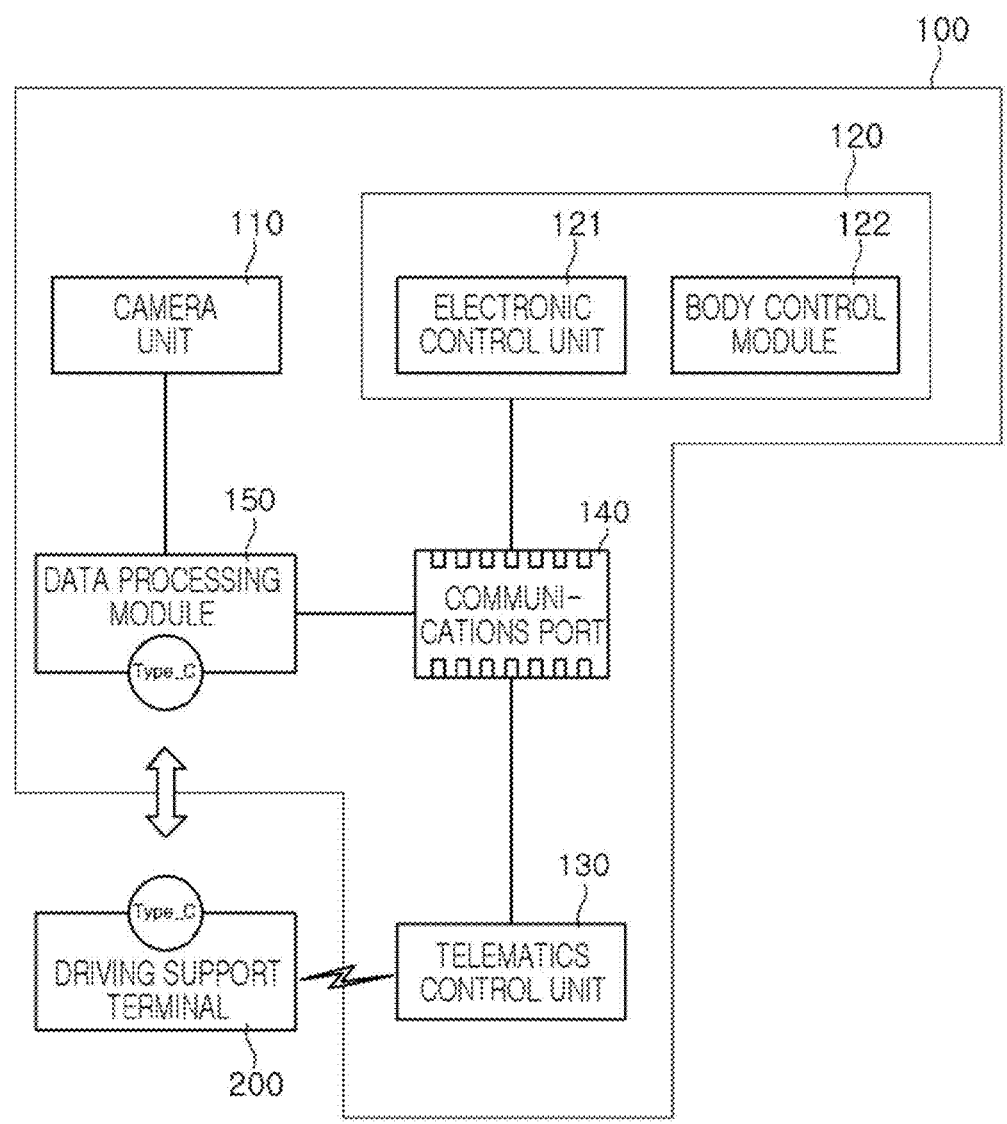
FIG. 3 is a block diagram illustrating a driving support system according to one or more embodiments.

FIG. 3 is a block diagram illustrating a driving support system according to one or more embodiments.

A driving support system in FIG. 3 may be similar to the driving support system illustrated in FIG. 2, and thus, overlapping descriptions will not be repeated, and differences will be described.

FIG. 2 illustrates an example in which a driving support terminal 200 is directly connected to a communications port 140. Referring to FIG. 3, however, the driving support terminal 200 may be directly connected to the data processing module 150 and may obtain an image obtained in a camera unit 110, travelling information and operating information of a vehicle generated in an electronic control unit 121, and post-processing data generated in a data processing module 150.

The driving support terminal 200 and the data processing module 150 may be interconnected with each other via a second connection terminal (Type_C). The driving support terminal 200 and the data processing module 150 each may include a second connection terminal (Type_OBD). As an example, the driving support terminal 200 and the data processing module 150 may be interconnected with each other via the C-type USB connection terminal.

Here, while the aforementioned mobile device 300 has not been discussed with respect to FIGS. 2 and 3, this discussion similarly applies to the driving program of the mobile device 300, and are also applicable to the aforementioned (and below) examples of the cooperative considerations of the driving support terminal 200 connected to the mobile device 300, where either or both of the driving support terminal 200 and the mobile device 300 may store and be respectively configured to implement their respective driving programs or selective components and functionalities of the same.

FIGS. 4 and 5 are block diagrams illustrating a driving support system according to one or more embodiments.

A driving support system in FIGS. 4 and 5 may be similar to the driving support system illustrated in FIGS. 1 to 3, and thus, overlapping descriptions will not be repeated, and differences will be described.

Referring to FIG. 4, the camera unit 110 in the example in FIG. 1 or the camera unit 110 and the data processing module 150 in the examples in FIGS. 2 and 3 may be additionally or alternatively implemented by the mobile device 300, including a smartphone or tablet, in differing examples. The mobile device 300 and a communications port 140 may be interconnected with each other through wireless communication such as Wi-Fi communications, for example, noting that examples are not limited thereto. In any of the examples herein, the mobile device 300 and a communications port 140 may also similarly be wirelessly connected to each other through the aforementioned example controller area network (CAN) communication. Thus, functions of the camera unit 110 or the camera unit 110 and the data processing module 150 may also, or additionally, be performed by a camera and a processor employed in the mobile device 300.

Referring to FIG. 4, a driving support terminal 200 may be directly connected to the mobile device 300 via a second connection terminal (Type_C). Referring to FIG. 5, a driving support terminal 200 may be directly connected to the communications port 140 via a first connection terminal (Type_OBD).

FIG. 6 is a block diagram illustrating a driving support system according to one or more embodiments.

A driving support system in FIG. 6 may be similar to the driving support system illustrated in FIGS. 4 and 5, and thus, overlapping descriptions will not be repeated, and differences will be described. In addition, discussion with respect to FIGS. 1-3 with respect to the driving program of the mobile device 300 and the driving support terminal 200 are also applicable to the driving support system of FIG. 6.

Referring to FIG. 6, a mobile device 300 in the example in FIG. 6 may thus include the functions and functionalities of the driving support terminal 200 illustrated in FIGS. 4 and 5. Thus, the functions and functionalities of the driving support terminal 200 illustrated in FIGS. 4 and 5, such as the implementation of the driving program of the driving support terminal 200 or mobile device 300, may be performed by one or more processors employed in the mobile device 300. For example, in different examples, the one or more processors may have the aforementioned different lower memory and processing capability configurations or higher memory and processing capability configurations, respectively of the respective zeroth through second ADAS level or the third through fifth ADAS level, or the one or more processors may have still greater memory and processing capability configurations than such discussions and not be pre-limited to a particular driving assistance or autonomous driving functionality grouping of ADAS levels. In addition, herein, the driving program functions and functionalities may be implemented by a CPU, NPU, GPU, and/or other processor(s) of the mobile device 300, such as an example where any or any combination of such processors load corresponding instructions and/or artificial intelligence models, e.g., as one or more neural network stored parameters, and uses a software development kit (SDK) and/or an application programming interface (API) that enables an example artificial intelligence model to run on the mobile device 300, such as with the particular processors of the mobile device 300 and the operating system of the mobile device 300. For example, the artificial model may be input to a model conversion tool to convert the artificial intelligence model into a deep learning container (DLC) format, then optimized using optimization tools, that generates a deep learning container format file that can be executed by an artificial intelligence application, for example. As a more particular example, the model conversion tools may be part(s) of a Neural Processing Engine (NPE) SDK (e.g., a Snapdragon Neural Processing Engine (SNPE)), which may convert such artificial intelligence models into a form and file format that can be executed by the NPE of the mobile device 300 with accelerated runtime operation with one or more processors of the mobile device 300, e.g., by one or more Qualcomm Snapdragon processors in the SNPE example. Such conversion may be performed by the mobile device 300, or by a remote device or server and stored in the converted format in the mobile device 300 for selective execution in accordance with the driving program instructions stored and executed by the mobile device 300. As another example, herein, example artificial intelligence models may be generated in, stored as, or converted into/from any of various formats, such as CaffeEmit, CNTK, CoreML, Keras, MXNet, ONNX, PyTorch, TensorFlow, and iOS formats for execution by such processor(s) of the mobile device 300. In another or additional example, a device driver level may be implemented by the operating system of the mobile device 300, where the artificial intelligence model is selectively executed by any or any combination of such processors through control of the device driver level, such as in an example that implements a Huawei HiAi Engine or hetrogenous computing system (HiHCS). In an example, the mobile device 300 may be interconnected with both a telematics control unit 130 and a communications port 140 through wireless communications, such as Wi-Fi communications, for example, and may obtain information of the vehicle 100. The discussed available configurations and capabilities of the mobile device 300 discussed here with respect to FIG. 6 are also applicable to all references herein to such mobile devices 300 in various examples discussed with respect to any or all other figures, and such further or alternate discussions of available configurations and capabilities discussed with such any or all other figures are also applicable to the mobile device 300 of FIG. 6.

Figure 7:
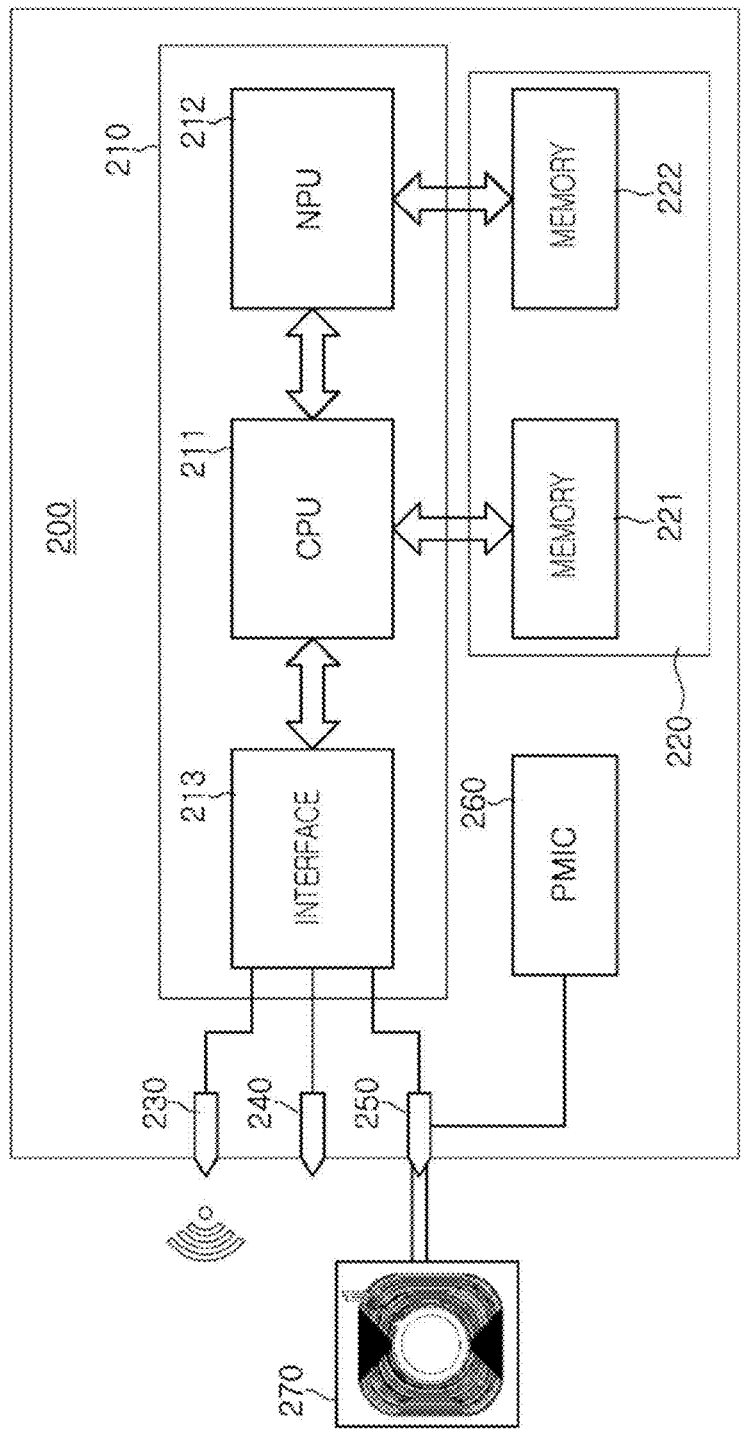
FIG. 7 is a block diagram illustrating a driving support terminal according to one or more embodiments.

FIG. 7 is a block diagram illustrating driving support terminal according to one or more embodiments.

A driving support terminal 200 in the example in FIG. 7 is a terminal that may provide an advanced driving support function, e.g., of the second ADAS level or lower, and the driving program of the driving support terminal 200 may include a driving assistance program, and for example, may thereby provide or support a forward collusion warning (FCW) function, a lane departure warning (LDW) function, a lane keeping assist (LKA) function, a blind spot warning (BSW) function, an adaptive cruise control (ACC) function, a travelling road recognizing function, a traffic signal recognizing function, and the like.

Referring to FIG. 7, a driving support terminal 200 examples herein may include an artificial intelligence processor 210, a memory unit 220, a communication module 230, and a communication terminal 240, and may further include a power terminal 250, as non-limiting examples.

The artificial intelligence processor 210 may include a central processing unit 211 (CPU), a neural processing unit (NPU) 212, and an interface 213. For example, in the NPU 212 may be a neuromorphic processor. The CPU 211, the NPU 212, and the interface 213 may be electrically connected to each other. The CPU 211 and the NPU 212 of the artificial intelligence processor 210 may be connected to the communication module 230, the communication terminal 240, and the power terminal 250 through the interface 213.

The memory unit 220 may store the driving program including a driving assistance program. The memory unit 220 may include a plurality of memories 221 and 222 storing the driving assistance program. The CPU 211 and the NPU 212 may be respectively connected to the plurality of different memories 221 and 222. Accordingly, upon execution of the driving assistance program stored in the memories 221 and 222, the CPU 211 and the NPU 212 may generate driving support information, for example. In an example, the plurality of memories 221 and 222 each may be implemented as a high bandwidth memory (HBM).

The communication module 230 may include a Wi-Fi communications module and may perform wireless communications with one or more external devices. For example, the communication module 230 may perform wireless communication with a telematics control unit 130 of a vehicle, as well as the mobile device 300 in any of the examples herein. In any of the various examples herein, a Wi-Fi communications module may also be included in a camera unit 110 and a communications port 140, and in this case, the communication module 230 may perform wireless communication with the camera unit 110 and the communications port 140.

The communication terminal 240 may be used as a path for receiving and transmitting data, such as to/from the vehicle and to/from the mobile device 300. For example, the communication terminal 240 may have a shape of a C-type USB connection terminal and an OBD-type connection terminal. Similar to above, in an example, the mobile device may include a similar artificial intelligence processor 210, memory unit 220, communication module 230, and communication terminals.

Figure 10:
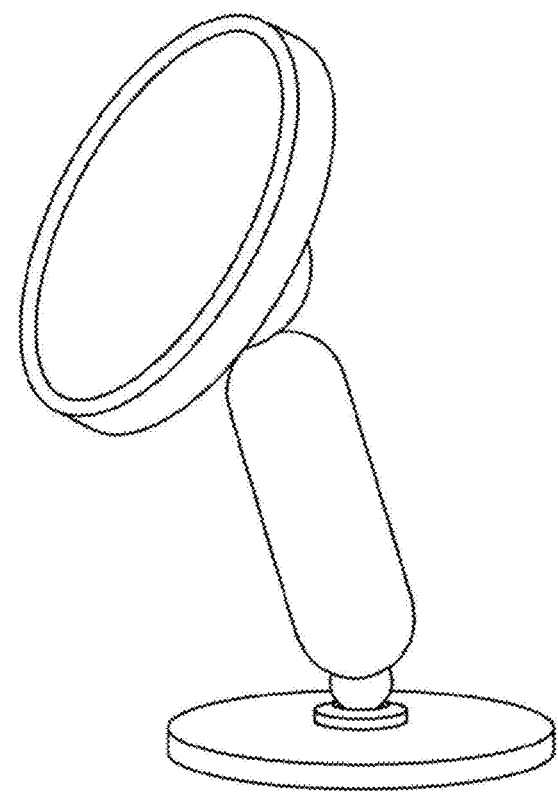
FIG. 10 is a perspective diagram illustrating a driving support terminal according to one or more embodiments.

The power terminal 250 may be connected to a battery of the vehicle, e.g., through the OBD connection or otherwise, and may provide power provided from the battery of the vehicle to each of the elements of the driving support terminal 200. In differing examples, the driving support terminal 200 may further include a power managing module (PMIC) 260 adjusting voltage of the power provided from the vehicle. The driving support terminal 200 may further include a transmitting coil 270 providing the power provided from the battery of the vehicle to an external device in a wireless manner. In this case, the driving support terminal 200 may be implemented as including a stand or a supporting form, for example, as illustrated in FIG. 10, to support and wirelessly transmit power, e.g., through inductive or resonant coupling, to the mobile device 300 illustrated in FIGS. 4 and 5, which is similarly configured for receipt of the wirelessly transmitted power through complementary inductive or resonant coupling.

In an example, the driving support terminal 200 may include the power terminal 250 such that the driving support terminal 200 receives power from the battery of the vehicle, though examples are not limited thereto. In any of the various examples herein, the driving support terminal 200 may also include a receiving coil and may also wirelessly receive power.

Figure 8:
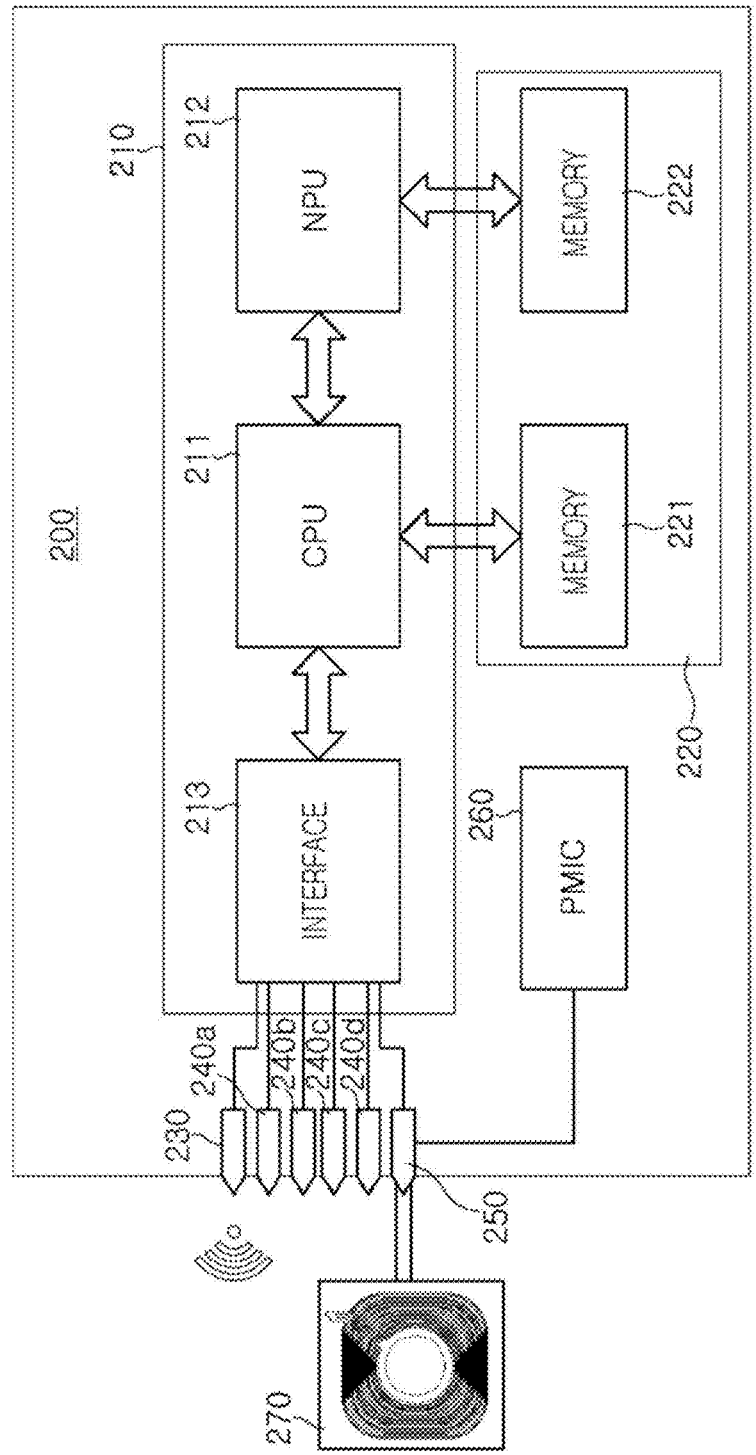
FIG. 8 is a block diagram illustrating a driving support terminal according to one or more embodiments.

FIG. 8 is a block diagram illustrating driving support terminal according to one or more embodiments.

A driving support terminal 200 in an example with FIG. 8 may be a driving support terminal providing an advanced driving support function of the third level or higher prescribed in an ADAS standard, and the driving program of the driving support terminal 200 may include driving assistance program and an autonomous driving program, or may include only an autonomous driving program, and, in an example, may thereby provide or support an occluded object prediction function, a lane changing function, a pedestrian recognizing function, a road change recognizing function, a road sign recognizing function, and the like. The driving support terminal 200 in FIG. 8 may be similar to the driving support terminal 200 illustrated in FIG. 7, and thus, overlapping descriptions will not be repeated, and differences will be described.

Referring to FIG. 8, a memory unit 220 in FIG. 8 may include a greater number of memories than the number of memories provided in the memory unit 220 illustrated in FIG. 7. For example, in the case in which the memory unit 220 in FIG. 7 includes two memories, the memory unit 220 illustrated in FIG. 8 may include four memories. In the memory unit 220, a CPU 211 and an NPU 212 may correspond to a plurality of memories, different from each other, and may lead a driving assistance program and an autonomous driving program.

Referring to FIG. 8, the driving support terminal 200 in FIG. 7 may include a single communication terminal 240, whereas the driving support terminal 200 in FIG. 8 may include a plurality of communication terminals 240*a*, 240*b*, 240*c*, and 240*d*.

The first communication terminal 240*a* may be a C-type USB connection terminal and an OBD-type connection terminal. The second communication terminal 240*b* may be a connection terminal of CAN network, the third communication terminal 240*c* may be a connection terminal of gigabit multimedia serial link (GMSL), and the fourth communication terminal 250*d* may be a communication terminal of Ethernet. Similar to above, in an example, the mobile device 300 may include a similar artificial intelligence processor 210, memory unit 220, communication module 230, and communication terminals.

Comparing the driving support terminals 200 in FIGS. 7 and 8, the driving support terminal 200 described with respect to FIG. 7 may provide an advanced driving support function of the second level or lower prescribed in ADAS standard, while the driving support terminal 200 in the example in FIG. 8 may provide an advanced driving support function of the third level or higher prescribed in ADAS standard. Thus, the driving support terminals 200 in FIGS. 7 and 8 may be different from each other, or be the same terminals with either memory and processing configuration or two respective driving support memory and processing configurations for providing such respective functionalities.

In an example of the driving support terminal 200 in FIG. 7, the CPU may have a specification of ARM Cortex A72x2 and A53x4 @1.5 GHz, and the NPU may have a processing speed of 10 peta floating point operations per second (TFLOPS). In such an example, the memory unit 220 may include a high bandwidth memory of 8 GB/512 bit, and as another example, the memory unit 220 may include a NAND Flash memory of 32 GB. The Wi-Fi communications module of the communication module 230 may provide at least a speed of 2.2 Gbps, for example. The communication module 230 may have a specification of IEEE 802.11ac/ax standard, 4×4 MU-MIMO, and 1024QAM, for example. In such an example, the driving support terminal 200 may have a power consumption level of 4 watts or less, and may have a size of 65×65 mm.

In an example of the driving support terminal 200 in FIG. 8, the CPU may have a specification of ARM Cortex A72x2 and A53x4 @3 GHz, and the NPU may have a processing speed of 100 peta floating point operations per second (TFLOPS). In such an example, the memory unit 220 may include a high bandwidth memory (HBM) of 32 GB/1024 bit. As another example, the memory unit 220 may include a NAND flash memory of 64 GB. The Wi-Fi communications module of the communication module 230 may provide at least a speed of 1 Gbps, for example. The communication module 230 may have a specification of IEEE 802.11ac/ax standard, 4×4 MU-MIMO, and 1024QAM. The example driving support terminal 200 may have a power consumption level of 6.6 watts, and may have a size of 180×120 mm.

Figure 9:
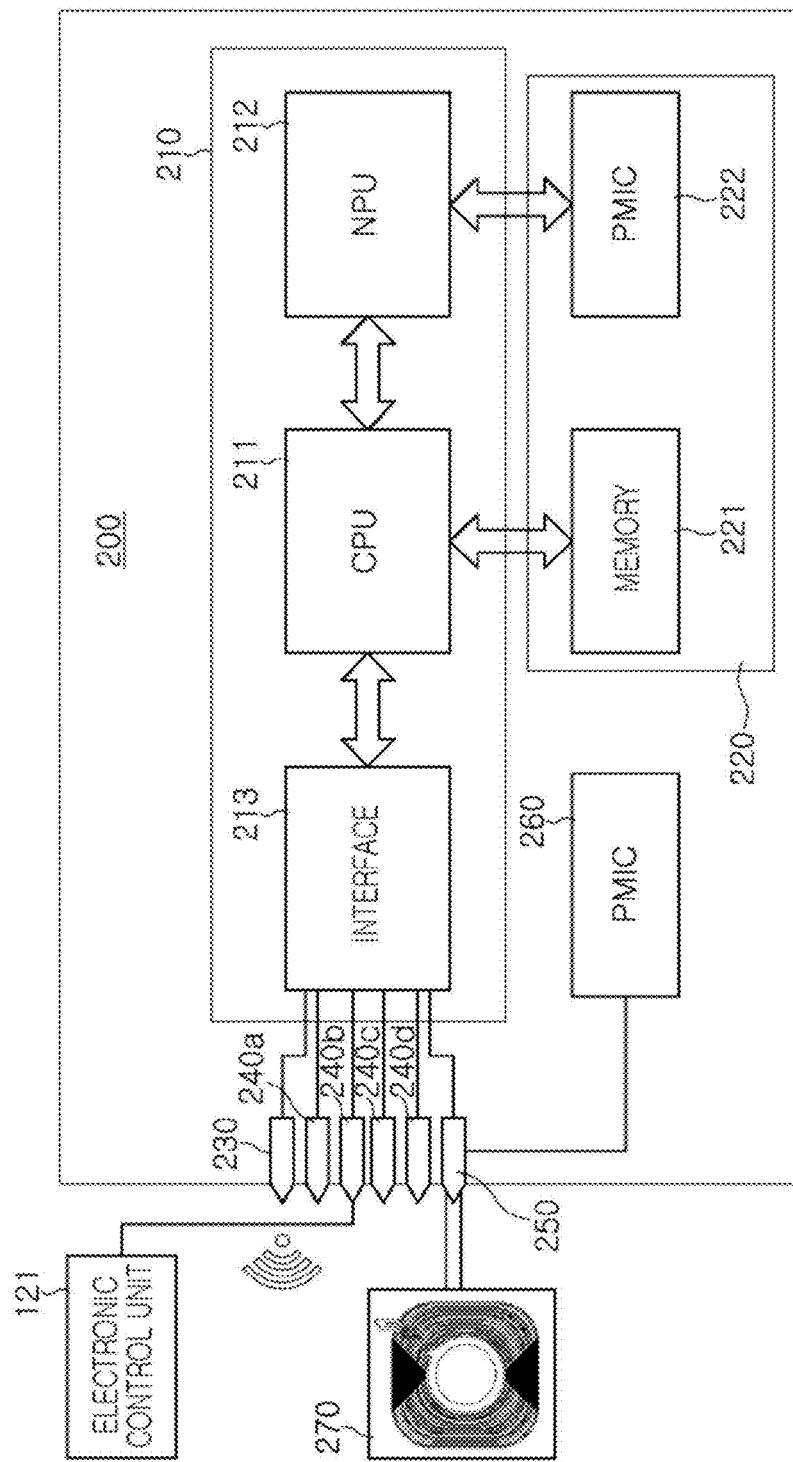
FIG. 9 is a diagram illustrating a connection relationship between a driving support terminal and a controller of a vehicle according to one or more embodiments.

FIG. 9 is a diagram illustrating an example connection relationship between a driving support terminal and a controller of a vehicle according to one or more embodiments.

Referring to FIG. 9, a driving support terminal 200 may be connected to a controller of the vehicle, e.g., an electronic control unit 121, via a third communication terminal 240*c*. The driving support terminal 200 may be connected to the electronic control unit 121 via the third communication terminal 240*c*, and may receive images of a camera unit 110 imaging a front region, side regions, and a rear region of the vehicle. In this case, the electronic control unit 121 may include a driving program that provides an advanced driving support function of the driving support terminal 200.

For the driving support terminal 200 to provide an advanced driving support function of a third level or higher prescribed in ADAS standard without delay, for example, a high-performance data processing speed and a high-performance data receiving and transmitting speed may be desired or required according to an ADAS standard, and thus a plurality of ports may thus be arranged to collect various data. However, depending on example processing, memory, and communication specifications, a small-sized driving support terminal 200 example may not fully satisfy the above described high performance aspects, and thus such smaller-sized driving support terminals may primarily implement the aforementioned example zeroth through second ADAS level functionalities, as non-limiting examples.

In an example, a driving program may be embedded in the electronic control unit 121, the vehicle may not include a driving program, or the driving program may include either or both of a driving assistance program and an autonomous driving program.

In an example, instructions for assisting the interaction of the driving support terminal 200 and/or the mobile device 300 with the electronic control unit 121 may be uploaded, installed, or embedded in the electronic control unit 121. For example, such instructions may assist the receipt and understanding by the electronic control unit 121, of information and/or control signaling from the driving support terminal 200 and/or the mobile device 300 provided through the communications port 140 or otherwise provided through the CAN network, where such understanding of such information or control signaling may include the driving support terminal 200 forwarding such information or control signaling to the appropriate vehicle components being controlled, or the electronic control unit 121 replicating and forwarding the same to the appropriate vehicle components as if the electronic control unit 121 has implemented its own driving program, e.g., thereby controlling of a provision or display of information, e.g., audibly and/or visually, from the driving support terminal 200 and/or the mobile device 300 and/or thereby controlling providing other driving assistance or different levels of autonomy in driving control from the driving support terminal 200 and/or the mobile device 300. The instructions may further include the addition of coding or controls, modifications, or deletions of current coding of the electronic control unit 121 for such receipt and understanding of such information or control signaling by the electronic control unit 121, or for controlled passivity of the electronic control unit 121 to merely forward the same information or control signaling to the corresponding components of the vehicle, or for controlling the electronic control unit 121 to not interrupt or interfere with the same controls or control signaling provided directly to such corresponding components by the driving support terminal 200 or the mobile device 300, e.g., by not issuing information or control signaling in accordance to the driving program of the electronic control unit 121 in addition to the information or control signaling from the driving support terminal 200 and/or the mobile device 300, or otherwise preventing such information or control signaling from displaying (or audibly reproducing) the user/driver the received information or controlling the corresponding components with the control signaling. Such instructions may further include the addition of coding or controls, modifications, or deletions of current coding of the electronic control unit 121 to control a cooperation of a current assisted driving program or autonomous driving program, or of select functionalities of either such program of the driving program of the electronic control unit 121 with the assisted driving program and/or autonomous driving programs, or of select functionalities of the same, of the driving support terminal 200 and/or the mobile device 300, as discussed above. This uploading, installing, or embedding may be through an automated process upon an initial connection of the driving support terminal 200 and/or the mobile device 300 to the communications port 140 or execution of a corresponding application or program of the driving support terminal 200 or mobile device 300 to begin or continue providing such driving assistance/control functions, or through user selection or authorization to upload, install, or embed the instructions to the electronic control unit 121, such as through an example user interface of the driving support terminal 200 or mobile device 300. Additionally, or alternatively, a separate control module may be inserted into the vehicle to perform a translation or handoff operation between the electronic control unit 121 and such information and control signaling from the driving support terminal 200 or mobile device 300. Such instructions uploaded, installed, or embedded in the electronic control unit 121 or that provide the translation or handoff operations through the separate control module may also provide similar interfacing functions to provide vehicle and sensed environmental information to the driving support terminal 200 and/or the mobile device for generation of such controls by the driving support terminal 200 and the mobile device 300. Still further, in an example, the electronic control unit 121 may be replaced with a same or compatible electronic control unit 121 that already includes such aforementioned instructions so the same is not necessary to be to uploaded, installed, or embedded.

Figure 11:
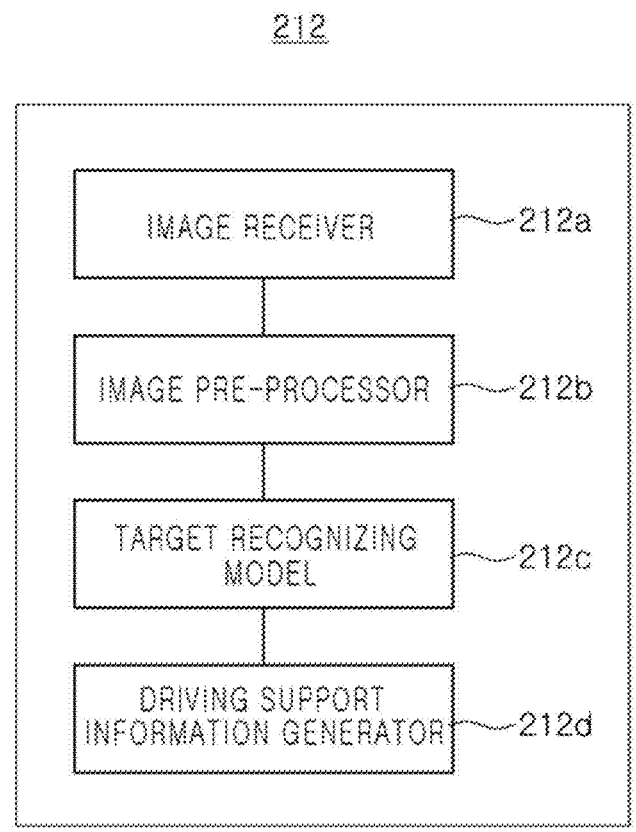
FIG. 11 is a block diagram illustrating an implementation of a driving program using an NPU according to one or more embodiments.

FIG. 11 is a block diagram illustrating an implementation of a driving program using an NPU according to a one or more embodiments.

An NPU 212 may implement an image receiver 212a, an image pre-processor 212b, target recognizing model 212c, and driving support information generator 212d, and, thus, may recognize a target in an image obtained in a camera unit 110 and generate driving support information specific to that recognized target.

The image obtained in the camera unit 110 may be input to the image receiver 212a.

The image pre-processor 212b may perform image processing to assign a region of interest (ROI) within the input image, and may generate therefrom an interest image. As an example, the image pre-processor 212b may extract edge components of the input image, such as through high frequency filtering, to detect different regions of interest and may generate corresponding interest images. For example, the image pre-processor 212b may perform normalization on a generated interest image, e.g., to have a predetermined size, such as a size that one or more subsequent artificial intelligence models have been trained. The image pre-processor 212b may still further perform calibration on a brightness of the normalized interest image. As an example, a brightness value of the normalized interest image may be calibrated using a zero-center approach. The image pre-processor 212b may provide the normalized-calibrated interest image to the target recognizing model 212c, which may be representative of example trained neural network system having a plurality of convolutional layers followed by an example feed forward, RNN, or other classifying trained layers, for example.

The target recognizing model 212c may implement a neural network system using stored parameters of the various layers of the neural network system, e.g., parameters that have been previously trained through deep-learning, such as through loss-based back propagation, with respect to training images for the particular purpose of the example target, and thus, upon loading the parameters from the memory, processing elements of the NRU 212 to analyze the pre-processed interest image through multiple neural network layers, the NRU 212 may recognize a target in the input image. As an example, the target recognizing model 212c may repeatedly implement the neural network system for recognizing the target in every received frame and/or for multiple detected ROIs of the input image and may recognize a target with a significantly high accuracy. Multiple such neural network systems may be performed in parallel, with each system being trained for recognizing a respective target, or the neural network system may be configured to perform a classification of the input image and recognize various trained targets. For example, the targets may include a traffic signal, a lane, a pedestrian, a road sign, and the like, such that the neural network system or respective neural networks systems are trained using various training images until the neural network system or respective neural network systems recognize the correct target within a predetermined accuracy or predetermined inaccuracy.

The driving support information generator 212d may implement the driving program, or components of the driving program. For example, the driving support information generator 212*d* may implement at least one of a driving assistance program and an autonomous driving program of the driving program, read from a memory, with respect to the target recognized in the target recognizing model 212*c*, and may generate driving support information specific to the recognized target, e.g., specific to the location of the recognized target as well as the relationship of the recognized target and other objects, etc. Herein, for each respective discussion, the described vehicle means a vehicle having engineered capabilities to implement at least the corresponding described driving assistance functionalities, and in examples discussing implementations of autonomous driving programs of a particular level or particular driving assistance functionality, then the corresponding vehicle is a vehicle with engineered capabilities for such corresponding functionalities. Alternatively, though the vehicle is a vehicle with at least engineered capabilities to implement at least one driving assistance functionality, examples include the driving support terminal 200 and/or the mobile device 300 determining the functionality of the vehicle and either not enabling functionalities of a driving program of the driving support terminal 200 and/or the mobile device 300 for which the vehicle is not capable of performing, or may disable or not implement the corresponding functionalities of the driving program of the driving support terminal 200 and/or the mobile device 300 the vehicle is not capable of performing.

FIGS. 12A and 12B respectively are a cross-sectional diagram and a plan diagram illustrating a driving support terminal according to one or more embodiments.

Figure 12:
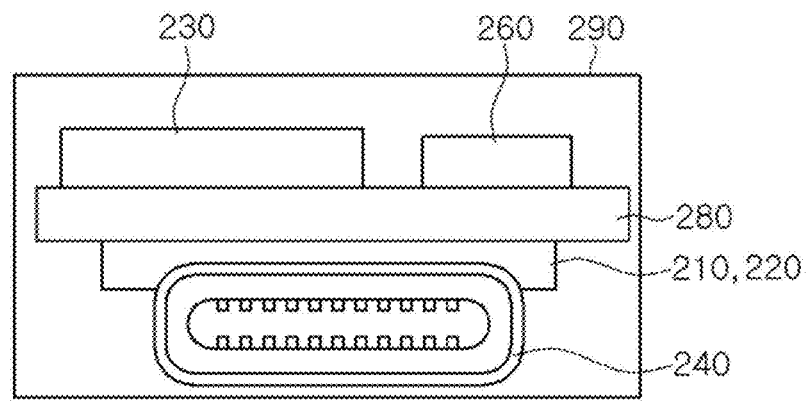
FIGS. 12A and 12B respectively are a cross-sectional diagram and a plan diagram illustrating a driving support terminal according to one or more embodiments.
Figure 12:
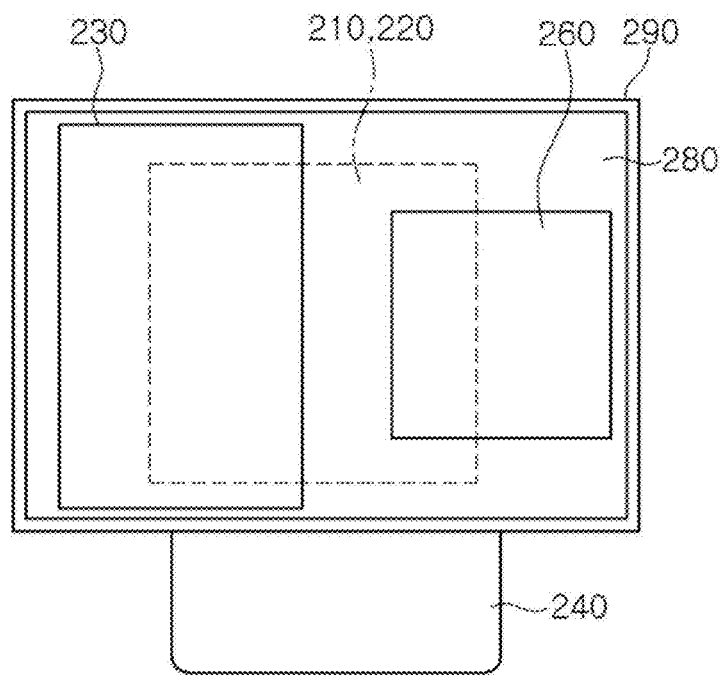

Referring to FIG. 12, a driving support terminal 200 in an example may include a substrate 280, an artificial intelligence processor 210, a memory unit 220, a communication module 230, a communication terminal 240, and a power managing module 260, and a housing 290, as non-limiting examples.

The artificial intelligence processor 210, the communication module 230, the communication terminal 240, and the power managing module 260 may be arranged on the substrate 280. The communication module 230 and the power managing module 260 may be arranged on one surface of the substrate 280, and the artificial intelligence processor 210 may be arranged on the other surface of the substrate 280. The communication terminal 240 may be arranged on the artificial intelligence processor 210. An exterior of the driving support terminal 200 may be formed by the housing 290, and the communication terminal 240 may extend and protrude in one direction to be connected to an external device, as a non-limiting example.

The artificial intelligence processor 210 may include, or load from a memory, a driving program, which may include an assistance program and/or an autonomous driving program, and which may including loading trained parameters of corresponding artificial intelligence models implemented by the respective programs, or selectively loading such parameters as needed, and may generate driving support information and driving assistance and autonomous driving control using data provided through the communication terminal, e.g., from the communications port of the vehicle and/or from additional cameras, such as of the mobile device 300, as well as other cameras connected to the mobile device 300, such as through a USB connector of the mobile device 300. The artificial intelligence processor 210 may include a central processing unit (CPU) and a neural processing unit (NPU), and may be integrated with the memory unit 220, as non-limiting example.

The communication module 230 may include a Wi-Fi communications module and may be configured to perform wireless communication with an external device. As an example, the communication module 230 may perform wireless communication with the telematics control unit 130 illustrated in FIG. 2, as well as one or more cameras, and the mobile device 300. The power managing module 260 may adjust voltage provided from a battery of a vehicle when the power managing module 260 is connected to the vehicle. The communication terminal 240 may be directly connected to an external device and may be used as a path for transmitting and receiving data, e.g., directly connected to the communication port of the vehicle and/or connected to the mobile device 300.

In FIG. 12, the communication terminal 240 may have a shape of a C-type USB connection terminal, but as described above, the communication terminal 240 may have a shape of an OBD-type connection terminal.

Figure 13:
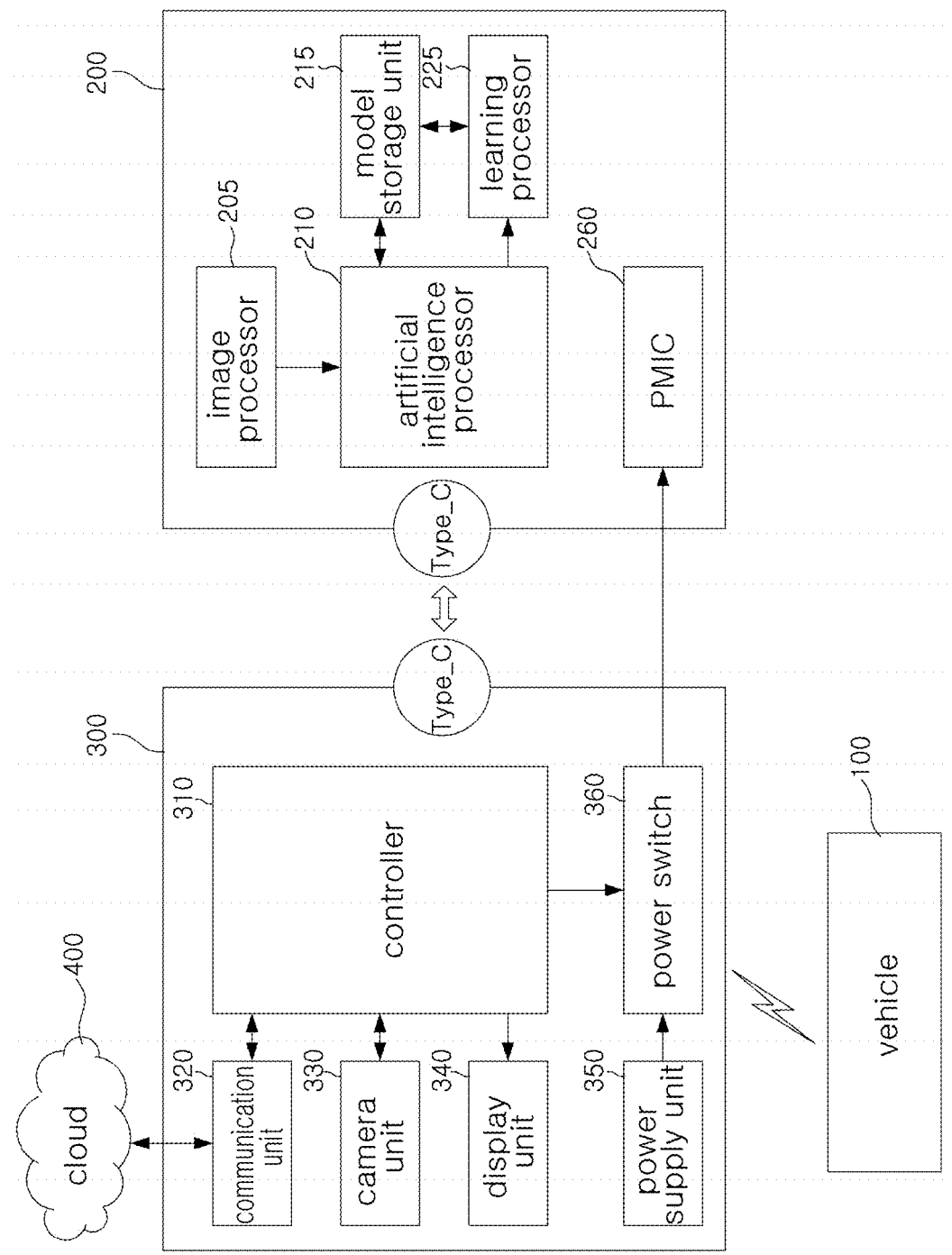
FIG. 13 is a block diagram illustrating a driving support system according to one or more embodiments.
Figure 14:
FIGS. 14 and 15 are diagrams illustrating a calibration operation performed by an image processor of the present disclosure.
Figure 15:
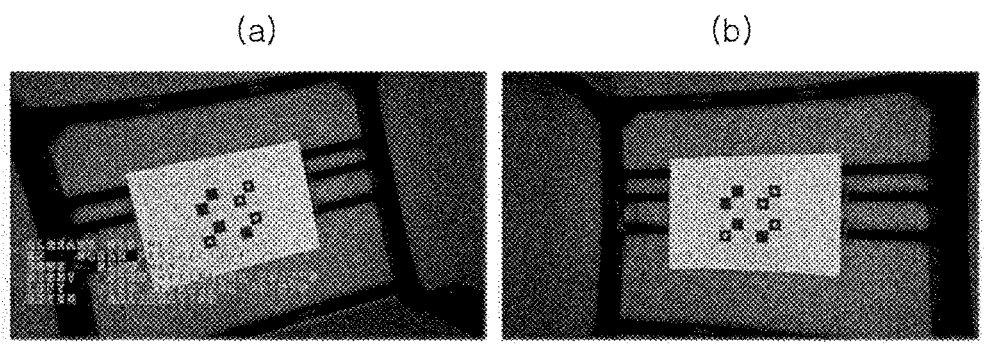
Figure 16:
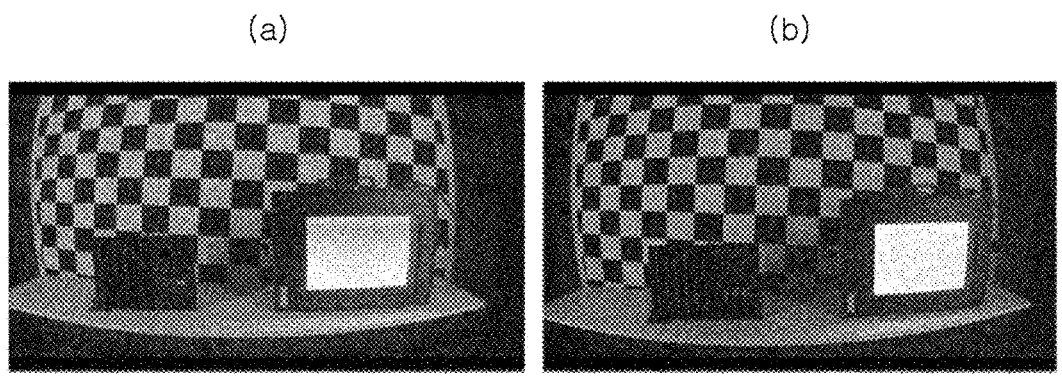
FIGS. 16 and 17 are diagrams illustrating an operation of controlling a camera unit performed by an artificial intelligence processor of the present disclosure.
Figure 17:
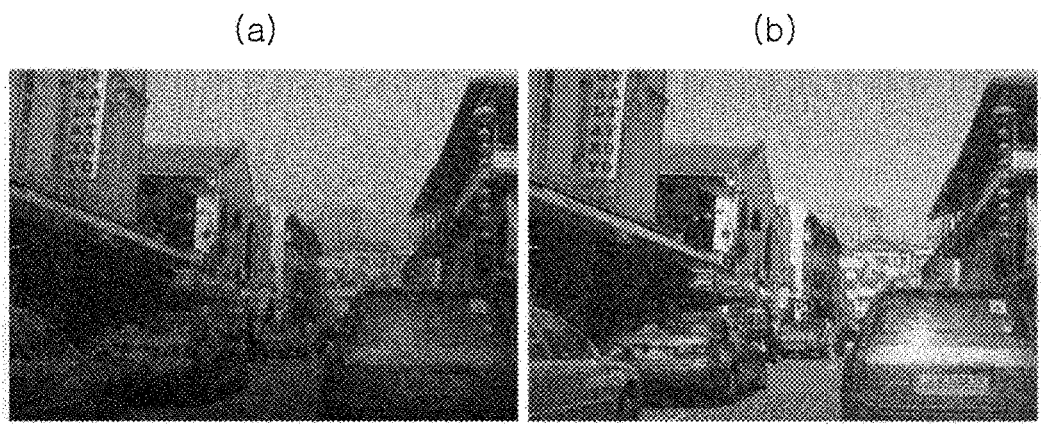

FIG. 13 is a block diagram illustrating a driving support system according to an example embodiment, FIGS. 14 and 15 are diagrams illustrating a calibration operation performed by an image processor of the present disclosure, and FIGS. 16 and 17 are diagrams illustrating an operation of controlling a camera unit performed by an artificial intelligence processor of the present disclosure.

As the driving support system in FIG. 13 is similar to the driving support system in FIGS. 1 to 12, overlapping descriptions will not be repeated and differences will mainly be described.

Referring to FIG. 13, the camera unit 110 in the example embodiment illustrated in FIG. 1 or the camera unit 110 and the data processing module 150 in the example embodiment illustrated in FIGS. 2 and 3 may be alternatively implemented by a mobile device 300 including a smartphone or a tablet. Accordingly, functions of the camera unit 110 or the camera unit 110 and the data processing module 150 may be performed by a camera unit and a controller employed in the mobile device 300.

Referring to FIG. 13, the mobile device 300 may include a controller 310, a communication unit 320, a camera unit 330, a display unit 340, a power supply unit 350, and a power switch 360.

The controller 310 may be electrically or functionally connected to the other blocks of the mobile device 300 and may control overall operations of the mobile device 300 and signal flows between internal blocks of the mobile device 300, and may process data. The controller 310 may include a central processing unit (CPU), an application processor, a graphics processing unit (GPU), and the like.

The communication unit 320 may be interconnected with an external cloud 400 through a network. The network may refer to a communication network formed using a predetermined communication method. The predetermined communication method may include all communication methods, such as communication through a predetermined communication standard, a predetermined frequency band, a predetermined protocol, or a predetermined channel. For example, the communication method may include a communication method through Bluetooth, BLE, Wi-Fi, Zigbee, 3G, 4G, 5G, and ultrasonic waves, and may include near-field communication, long-distance communication, wireless communication, and wired communication.

Meanwhile, the vehicle 100 may be interconnected with the mobile device 300 through wireless communication. For example, a communication port 140 (see FIGS. 1 to 3) of the vehicle 100 may be interconnected with the communication unit 320 of the mobile device 300 through wireless communication such as Wi-Fi communication. As another example, the communication port 140 (see FIGS. 1 to 3)

may be wirelessly connected to the communication unit 320 of the mobile device 300 through controller area network (CAN) communication.

The camera unit 330 may be mounted on a front surface or a rear surface of the mobile device 300 and may image an external area of the mobile device 300. The camera unit 330 may provide generated images to the controller 310.

The display unit 340 may be provided on the front surface of the mobile device 300 and may output information according to a user input on a screen. For example, the display unit 340 may be integrated with a touch screen device for receiving a user touch input.

The power supply unit 350 may be electrically connected to the other blocks of the mobile device 300, and may supply power required for driving the other blocks. For example, the power supply unit 350 may include a non-rechargeable primary battery, a rechargeable secondary battery, or a fuel cell. The power supply unit 350 may be integrally provided in the mobile device 300 or may be provided detachably from the mobile device 300.

The power switch 360 may provide power provided from the power supply unit 350 to a driving support terminal 200. The controller 310 may detect whether the driving support terminal 200 is connected to the mobile device 300, and may control a power providing operation of the power switch 360. For example, when the driving support terminal 200 is connected to the mobile device 300, the controller 310 may control the power switch 360 to be turned on and may provide power to the driving support terminal 200, and, for example, when the driving support terminal 200 is not connected to the mobile device 300, the controller 310 may control the power switch 360 to be turned off and may block power supply to the driving support terminal 200.

Referring to FIG. 13, the driving support terminal 200 may include an artificial intelligence processor 210, an image processor 205, a model storage unit 215, a learning processor 225, and a power managing module 260, as a non-limited example. The driving support terminal 200 may be directly connected to the mobile device 300 through a second connection terminal Type_C.

The power managing module (PMIC) 260 may adjust a voltage of power supplied from the mobile device 300. The power managing module 260 may be electrically connected to the other blocks of the driving support terminal 200 and may supply power required for driving the other blocks.

The image processor 235 may pre-process an image provided from the camera unit 330 of the mobile device 300. When the driving support terminal 200 is interconnected with the mobile device 300 through the second connection terminal (Type_C), the image processor 235 may receive an image from the camera unit 330 of the mobile device 300.

According to an example embodiment, the controller 310 of the mobile device 300 may primarily pre-process the image provided from the camera unit 330, and the image processor 235 may secondarily pre-process the primarily pre-processed the image. To this end, the controller 310 of the mobile device 300 may include a separate image processor. The image processor 235 may correspond to the image pre-processor 212b illustrated in FIG. 11.

As an example, the image processor 235 may perform image processing to allocate a region of interest (ROI) within the image provided from the camera unit 330, and may generate an interest image therefrom. As an example, the image processor 235 may detect different regions of interest by extracting an edge component of the input image through high frequency filtering, and may generate an interest image corresponding to the different regions of interest.

For example, the image processor 235 may perform normalization on the generated region of interest such that one or more subsequent artificial intelligence models have a predetermined size equal to a trained size. The image processor 235 may also perform additional calibration for brightness of the normalized interest image. When the image processor 235 calibrates brightness of the normalized interest image, a brightness value of the interest image illustrated in FIG. 14(*a*) may be appropriately reduced such that object visibility may improve as in the interest image illustrated in FIG. 14(*b*). As an example, the brightness value of the normalized interest image may be calibrated using a zero-center method.

Meanwhile, the image processor 235 may perform additional calibration by rotating the normalized interest image. When the image processor 235 performs calibration by rotating the interest image illustrated in FIG. 15(*a*) in a clockwise or counterclockwise direction, a horizontal side and a vertical side of the interest image illustrated in FIG. 15(*b*) may be changed to be disposed in horizontal and vertical directions.

The image processor 235 may provide the normalized and calibrated interest image to the artificial intelligence processor 210. The artificial intelligence processor 210 may use the interest image provided from the image processor 235 as input data.

The artificial intelligence processor 210 may be electrically or functionally connected to the other blocks of the driving support terminal 200, and may control overall operations of the driving support terminal 200 and signal flows between the internal blocks of the driving support terminal 200, and may process the data.

The artificial intelligence processor 210 may include an artificial neural network processing unit.

An artificial neural network is a modeling the operating principle of biological neurons and the relationship between the neurons, and is an information processing system in which a plurality of neurons called nodes or processing elements are connected in the form of a layer structure. An artificial neural network are a model used for machine learning, a statistical learning algorithm inspired by biological neural networks (the central nervous systems of animals, especially the brain) in machine learning and cognitive science.

Concretely, an artificial neural network refers to an overall model having a problem-solving ability by changing the strength of synaptic bonding through learning by artificial neurons (nodes) which form a network by combining synapses. The neural network may include a plurality of layers, and each of the layers may include a plurality of neurons. Also, an artificial neural network may include synapses that connect neurons.

In general, an artificial neural network may be defined by an activation function that generates an output value from the following three factors, which are, a connection pattern between neurons of different layers, a learning process to update the weight of the connection, and a weighted sum of inputs received from the previous layer.

An artificial neural network may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

An artificial neural network is classified into single-layer neural networks and multi-layer neural networks according to the number of layers.

An artificial neural network may be trained using training data. Here, learning refers to a process of determining parameters of an artificial neural network using training data in order to achieve the purpose of classifying, regressing, or clustering input data. As a representative example of parameters of artificial neural networks, there may be weights applied to synapses or biases applied to neurons.

The artificial intelligence processor 210 may receive input data and training data for model training.

The artificial intelligence processor 210 may apply input data provided from the image processor 205 to a trained model stored in the model storage unit 215 and may infer output data.

Meanwhile, the artificial intelligence processor 210 may control at least one block provided in the mobile device 300 according to input data corresponding to the interest image provided from the image processor 205.

As an example, as illustrated in FIG. 16(a), when a flicker phenomenon is included in the interest image, a shutter speed of the camera unit 330 may be changed through the controller 310, thereby removing a flicker phenomenon included in the interest image as illustrated in FIG. 16(b).

As another example, as illustrated in FIG. 17(a), when screen brightness of the interest image is dark, an aperture value of the camera unit 330 may be changed through the controller 310, thereby appropriately changing screen brightness of the interest image as illustrated in FIG. 17(b).

The learning processor 225 may train (or learn) an artificial neural network stored in the model storage unit 215 using training data provided from the artificial intelligence processor 210.

The artificial intelligence processor 210 may transmit training data provided from the communication unit 320 of the mobile device 300 to the learning processor 225. The communication unit 320 may download training data from the cloud 400. When the driving support terminal 200 is interconnected with the mobile device 300 through the second connection terminal (Type_C), the artificial intelligence processor 210 may download the training data through the communication unit 320 of the mobile device 300. That is, when the driving support terminal 200 is interconnected with the mobile device 300 through the second connection terminal Type_C, the training data may be updated.

The driving support terminal 200 may be directly connected to the mobile device 300 through the second connection terminal (Type_C).

The artificial intelligence processor 210 may pre-process input data and training data and may generate pre-processed input data and pre-processed training data. For example, the pre-processing of input data, performed by the artificial intelligence processor 210, may refer to extracting an input feature from the input data.

The model storage unit 215 may store an artificial neural network. The artificial neural network stored in the model storage unit 215 may include a plurality of hidden layers. However, the artificial neural network in the example embodiment is not limited thereto. The artificial neural networks may be implemented by hardware, software, or a combination of hardware and software. When a portion or entirety of the artificial neural network is implemented by software, one or more command words configuring the artificial neural network may be stored in a memory.

The artificial neural network stored in the model storage unit 215 may be learned through the learning processor 225. The model storage unit 215 may store a model being trained or learned by the learning processor 225. When the model is updated through learning, the model storage unit 215 may store the updated model. The model storage unit 215 may classify the learned model into a plurality of versions according to a learning time point or a learning progress and may store the models, if necessary.

As an example, the model storage unit 215 may include the target recognizing model 212c illustrated in FIG. 11.

The target recognizing model 212c may implement a neural network system using stored parameters of various layers of the neural network system, such as, for example, previously trained parameters through deep learning such as loss-based back propagation with respect to training for an image for a specific purpose of an example target. Accordingly, the target recognizing model 212c may, by uploading parameters from a memory, process components of the NRU 212 to analyze the pre-processed interest image through a plurality of neural network layers such that the NRU 212 may recognize a target in the input image. As an example, the target recognition model 212c may repetitively implement a neural network system to recognize the target for each received frame and/or for a plurality of detected ROIs of the input image, and may recognize the target with very high accuracy. Such a plurality of neural network systems may be trained for each system to recognize a corresponding target and may be performed in parallel, or the neural network system may be configured to classify an input image and may recognize various trained targets. For example, the target may include traffic signals, lanes, crosswalks, road signs, and the like, such that the neural network systems or each neural network system may be trained using various training images until the neural network systems or each neural network system recognizes an accurate target within a predetermined accuracy or predetermined inaccuracy.

Meanwhile, the driving support information generator 212d in FIG. 11 may be implemented by the artificial intelligence processor 210.

The driving support information generator 212d may implement a driving program or components of a driving program. For example, the driving support information generator 212d may implement at least one of a driving assistance program and an autonomous driving program of a driving program read from the memory with respect to the target recognized in the target recognizing model 212c, and may generate the driving support information specified for the recognized target, such as, for example, specified for the location of the recognized target and the relationship between the recognized target and other objects.

The learning processor 225 may train (or learn) an artificial neural network stored in the model storage unit 215 using training data.

The learning processor 225 may acquire training data provided from the artificial intelligence processor 210 and may learn the artificial neural network stored in the model storage unit 215. For example, the learning processor 225 may determine optimized model parameters of the artificial neural network by repeatedly training the artificial neural network using various well-known learning techniques. By being trained using training data, an artificial neural network of which parameters are determined may be referred to as a training model or a trained model.

The cameras, camera units, camera unit 110, electronic control units, vehicle control unit 120, electronic control unit 121, body control module 122, controllers, communications ports, communication port 140, telematics control unit 130, data processing modules, pre-processors, data processing module 150, modules, terminals, managing modules, driving support terminals, driving support terminals 200, mobile devices, mobile devices 300, mobile phones, communication modules, communication module 230, communication terminals 240, 240a-d, power terminal 250, transmitting coil 270, PMIC 260, memory unit 220, memories, memories 221 and 222, connectors, neuromorphic processors, processors, NPUs, NPU 212, CPUs, CPU 211, interfaces, interface 213, artificial intelligence processors, artificial intelligence processor 210, and other apparatuses, terminals, modules, units, devices, and other components described herein with respect to FIGS. 1-12B are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated and discussed with respect to FIGS. 1-11 and that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blue-ray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A driving support system, comprising:
a vehicle, and
a driving support terminal configured to interact with the vehicle,
wherein the vehicle comprises:
a camera system configured to generate first image information of a periphery of the vehicle, a vehicle controller configured to generate driving information of the vehicle, and a communications port, and
wherein the driving support terminal comprises one or more processors configured to:
connect with the communications port,
obtain the image information from the camera system of the vehicle and the driving information using the communications port,
obtain second image information from another camera, separate from the vehicle, and
execute at least a portion of a driving program, of the driving support terminal, based on the driving information and at least one of the first image information from the camera system, and the second image information obtained from the another camera to control the vehicle with respect to one or more assistive driving operations and autonomous operations by the vehicle based on control signaling generated by the driving support terminal and provided to the vehicle.

2. The driving support system of claim 1, wherein the driving program of the driving support terminal comprises one or more of a driving assistance program and an autonomous driving program.

3. The driving support system of claim 2, wherein the vehicle controller is configured to execute a vehicle driving program comprising one or more of a vehicle driving assistance program and a vehicle autonomous driving program, stored in a memory of the vehicle, to control the vehicle.

4. The driving support system of claim 3, wherein the one or more processors of the driving support terminal are further configured to determine which of the driving assistance program of the driving program of the driving support terminal and the vehicle driving assistance program of the vehicle driving program are a highest advanced driver assistance system (ADAS) level driving assistance program, and/or determine which of the autonomous driving program of the driving program of the driving support terminal and the vehicle autonomous driving program of the vehicle driving program are a highest ADAS level autonomous driving program, and configured to execute the highest ADAS level driving assistance program and/or the highest ADAS level autonomous driving program to control the vehicle with respect to the one or more assistive driving and/or autonomous operations by the vehicle.

5. The driving support system of claim 3, wherein the one or more processors of the driving support terminal are further configured to perform a first determination of which functionalities of the driving program of the driving support terminal are of a greater functionality level than corresponding functionalities of the vehicle driving program, perform a second determination of which functionalities of the driving program of the driving support terminal are not provided by the vehicle driving program, and/or perform a third determination of which functionalities of the vehicle driving program are not provided by the driving program of the driving support terminal, and configured to control implemented driving program functionalities by the vehicle by selectively implementing, as controlled by the driving support terminal, the driving program of the driving support terminal and the vehicle driving program based on any one or any combination of the first determination, the second determination, and the third determination to control the vehicle with respect to the one or more assistive driving and/or autonomous operations by the vehicle.

6. The driving support system of claim 2, wherein, for the generating of the control signaling, the driving assistance program is configured to generate driving support control signaling and driving support information, where the driving support control signaling is signaling to assistively control an assistive driving operation of the vehicle to display the driving support information.

7. The driving support system of claim 6, wherein the driving support information of the vehicle includes information instructing the driver to control at least one of a steering operation, a braking operation, and an acceleration operation of the vehicle.

8. The driving support system of claim 7, wherein the instructing of the driver includes warning of obstacle detection and/or instructing the driver to perform corresponding obstacle avoidance steering and/or braking, providing rear collision warning and/or instructing the driver to perform corresponding rear collision avoidance braking, providing lane departure warning, instructing the driver to perform corresponding lane departure remedy or maintenance steering, and/or instructing the driver of suggested lane changes determined by the driving program.

9. The driving support system of claim 2, wherein, for the generating of the control signaling, the driving assistance program is configured to generate driving support control signaling, where the driving support control signaling is signaling to control an assistive driving operation of the vehicle to assistively control at least one of a steering operation, a braking operation, and an acceleration operation of the vehicle.

10. The driving support system of claim 9, wherein the signaling to control the assistive driving operation of the vehicle to assistively control the at least one of the steering operation, the braking operation, and the acceleration operation of the vehicle includes controlling at least one of the steering operation, the braking operation, and the acceleration operation of the vehicle for detected obstacle assistive avoidance, detected rear collision assistive avoidance, predicted and/or detected lane departure assistive prevention or remedy, and/or assistive lane changing determined by the driving program.

11. The driving support system of claim 10, wherein the driving support control signaling is signaling to control the assistive driving operation of the vehicle to display driving support information generated by the driving assistance program indicating information regarding the at least one of the assistively controlled steering operation, braking operation, and acceleration operation of the vehicle.

12. The driving support system of claim 2, wherein the autonomous driving program is configured to generate driving control signaling, where the driving control signaling is signaling to control an autonomous driving operation of the vehicle to control at least one of a steering operation, a braking operation, and an acceleration operation of the vehicle without assistive control by the driver.

13. The driving support system of claim 12, wherein the generation of the driving control signaling includes performing any one or any combination of two or more of an occluded object prediction, a lane changing determination, a pedestrian recognition, a road change recognition, and a road sign recognition, and generating the driving control signaling based on results of the performance.

14. The driving support system of claim 13, wherein the one or more processors of the driving support terminal include one or more artificial intelligence processors configured to load from a comprised memory of the driving support system one or more artificial intelligence models and implementing the one or more artificial intelligence models to perform the any one or any combination of two or more of the occluded object prediction, the lane changing determination, the pedestrian recognition, the road change recognition, and the road sign recognition, and the generation of the driving control signaling based on results of the performance.

15. The driving support system of claim 14, wherein the one or more artificial intelligence processors include one or more neuromorphic processors, and the one or more artificial intelligence models are respective neural network models.

16. The driving support system of claim 1, wherein the one or more processors are configured to perform post processing on the obtained image information and/or other image information obtained by the driving support terminal model, and the one or more processors include one or more artificial intelligence processors, where the executing of the at least the portion of the driving program includes executing one or more neural network models that provide the post processed obtained image information and/or the post processed other image information.

17. The driving support system of claim 1, wherein the one or more processors are configured to perform post processing on the obtained image information and/or other image information obtained by the driving support terminal model, and the one or processors include one or more artificial intelligence processors, where the one or more processors are configured to implement a navigation program using the post processing obtained image information and/or the post processed other image information by executing one or more neural network models using the one or more artificial intelligence processors provided the post processed obtained image information and/or the post processed other image information.

18. The driving support system of claim 1, wherein the one or more processors are configured to connect with the communications port to obtain the driving information, and are configured to obtain the second image information from the another camera, separate from the vehicle, in communication with the driving support terminal, and execute the at least the portion of the driving program based on the obtained driving information and the second image information.

19. The driving support system of claim 18, wherein the one or more processors are configured to generate, from the second image information, an image of a periphery of the vehicle, and configured to provide the image of the periphery of the vehicle to the vehicle for display by the vehicle.

20. The driving support system of claim 1, wherein the driving support terminal includes an on-board diagnostics (OBD)-type connection terminal, and the driving support terminal is connected to the communications port using the OBD-type connection terminal.

21. The driving support system of claim 1, wherein the first image information is obtained from the vehicle and/or the second image information is obtained from the another camera separate from the vehicle, and the one or more processors are further configured to implement at least one of a navigation program using the first image information and/or the second image information, and the driving information.

22. The driving support system of claim 21, wherein the driving support terminal is connected to the communications port with a C-type USB terminal connection.

23. The driving support system of claim 2, wherein the driving support terminal comprises:
a memory storing the driving assistance program and the autonomous driving program; and
the one or more processors include a neural processing unit configured to generate the driving support information through the execution of the at least the portion of the driving program.

24. The driving support system of claim 23, wherein the neural processing unit comprises:
an image input receiver to which an image obtained from the camera system is input;
an image pre-processor configured to extract a region of interest image from the image input to the image receiver;
a target recognizing neural network model implemented to recognize a target in the interest image; and
a driving support information generator configured to execute at least a portion of the driving assistance program and/or the autonomous driving program with respect to the recognized target.

* * * * *